United States Patent
Conley

(10) Patent No.: US 6,369,949 B1
(45) Date of Patent: Apr. 9, 2002

(54) OPTICALLY ANISOTROPIC MICRO LENS WINDOW

(76) Inventor: Kenneth E. Conley, 3308 Mikelynn La., Matthews, NC (US) 28105

( * ) Notice: Subject to any disclaimer, the term of this patent is extended or adjusted under 35 U.S.C. 154(b) by 0 days.

(21) Appl. No.: 09/547,654

(22) Filed: Apr. 12, 2000

(51) Int. Cl.[7] .............................................. G02B 27/10
(52) U.S. Cl. ...................................................... 359/619
(58) Field of Search ................................ 359/619, 625, 359/626

(56) References Cited

U.S. PATENT DOCUMENTS

| | | | |
|---|---|---|---|
| 3,781,091 A | * 12/1973 | Ferguson | 350/167 |
| 4,541,727 A | 9/1985 | Rosenthal | 368/232 |
| 5,642,226 A | 6/1997 | Rosenthal | 359/619 |
| 5,644,431 A | 7/1997 | Magee | 359/619 |
| 5,672,519 A | * 9/1997 | Song | 437/3 |
| 5,694,246 A | * 12/1997 | Aoyama | 359/619 |
| 5,933,276 A | 8/1999 | Magee | 359/455 |

* cited by examiner

Primary Examiner—Ricky Mack
Assistant Examiner—Gary O'Neill
(74) Attorney, Agent, or Firm—Dougherty & Clements LLP

(57) ABSTRACT

The present invention is an optical device having an anisotropic lens array that enables the viewer to perceive a repertoire of preselected images over a first range of angles of regard or to see through the device to a scene beyond the device without distortion. The preselected images in one orientation gives the illusion of a repertoire of images at differing depths. The preselected images at a second orientation can produce a set of optical effects wherein: one image gradually transforms to another; the repertoire of images are unrelated and change suddenly from one to another; the repertoire of images are frames of a motion scene; or, the repertoire of images represent a scene at differing magnifications. Previous attempts at similar objectives have failed to achieve either distortion-free windowing or a reasonably rich repertoire of images. The device may also be applied to applications requiring optical anisotropy such as privacy filtering.

20 Claims, 17 Drawing Sheets

OPTICALLY ANISOTROPIC MICRO LENS WINDOW

FIELD OF THE INVENTION

The present invention relates to optical devices wherein the image seen by a viewer depends on the viewer's angle of regard with respect to the plane of a windowpane-shaped device. More particularly, the invention relates to a lenticular sheet with periodic optical elements formed such that the viewer perceives a series of images which change depending on the viewer's angle of regard of the windowpane-shaped device.

DESCRIPTION OF THE RELATED ART

Existing optical systems can present a sequence of two or more images which appear as the viewer changes their angle of regard over a range of less than 90°, typically about 45°. The viewer's angle of regard is the angle between a normal to a plane and a viewer's eye. These systems use a device consisting of a regular array of plano-convex cylindrical lens elements with a periodicity that depends on a viewing distance for which the device is designed. For example, at normal viewing distances for reading of 18 inches, the periodicity of the cylindrical elements is preferably 100 elements to the inch or more. Optical system designs of up to 250 elements per inch can be achieved using such systems. Each lens element brings a slice of an underlying printed image into focus. The underlying printed image is composed by a computer program from a desired image sequence, the optics used and viewing geometry. Without the array of lenses, the printed image appears to be a set of stripes that run orthogonally to the axes of the lenses with a multi-image stripe periodicity equal to the lens periodicity but divided into image-specific stripes by the number of images in the set. For example, if the set has eight images and the lenses are at 100 per inch, a periodicity of eight stripes in 0.01 inches are used, one stripe for each image. The viewer sees the intersection of a focused stripe due to the lens and the printed stripe. Technically, two configurations exist, one in which the cylindrical axes are vertical, and one in which the axes are horizontal. In the vertical case, the images are selected to appear at differing depths since the right and left eyes of the viewer have differing angles of regard. The device can be stationary, and, typically, eight images that appear to be at differing depths are superimposed. In the horizontal case, the viewer's angle of regard must be changed. As the device is rotated through a series of angles of regard, a sequence of images is seen. Various effects are possible depending on the design of the stripes. One image can gradually transform into another, termed "morphing". A sequence of images of various stages of an action scene can give a motion-like effect, termed "motion". If the images are unrelated, the viewer will see the unrelated sequence appear, termed "flip". One image can be a magnification of the preceding image and the effect is similar to looking through a zoom lens, termed "zoom".

Existing lens array are fabricated by first designing a cutting tool with a desired lens shape, then using this tool to cut the shape of an array of flat lenses into a flat plate or cylinder. This pattern is then transferred to a plastic sheet using conventional methods. The striped image array can be produced by a thermal or piezoelectric ink jet printer that is readily capable of producing 1200 picture elements per inch and laminated to the flat side of the array. When the thickness of the lens array sheet is small enough, the pattern can be reverse printed using a printing press. Reverse printing using a transfer printing press is an option for array resolutions of greater than 60 elements per inch. Another option for directly printing a reverse image on the array is screen printing which is an option for array resolutions of greater than 10 elements per inch up to about 60 elements per inch. The lamination technique is broadly applicable. The printing medium may be plastic or paper. Since the printed array has the same frequency as the lens array, the print that contains the multiple image information must be linearly registered to the lens. The device operation is designed into the image dissection and the lens array. The lens array is typically fabricated from a plastic. Many different materials can be used, for example acrylics, polystyrenes, polycarbonates, polyesters or equivalent materials. The thickness of the finished sheet is related to the periodicity of the lens elements, which effects the lens cross section. The thickness of the array depends on the index of refraction of the plastic material.

$$T \propto \frac{Dn}{2(n-1)} \quad [1]$$

Where:
T is the thickness of the sheet,
D is the width of a lens element (in consistent units with T),
n is the index of refraction of the material.

The above formula assumes that the lens cross section is substantially circular. Other cross sections have been proposed. For example, U.S. Pat. No. 5,642,226 suggests a parabolic cross-section. The proportionality relation still holds for the parabolic cross-section, but the constant that must be introduced to make the equation an equality is different.

The criteria for a satisfactory lens design include the ability for the lens to sharply focus on the image plane. In order to provide an unequivocal differentiation from one selection to the next, the uncertainty of the focus at each selected angle of the array must be small enough. For a sequence of eight images, the uncertainty should be about 6% of the width of the lens or less. The range of foci along the dimension orthogonal to the lens axis determines the range of angles available for the image effects. At an angle of regard larger than about 30°, each lens focuses on a slice that is under the orthogonal projection of the next lens element on the image plane. However, the selection quality can nonetheless be judged over the ±30° range. Within the range of angles used in the design, the foci should stay within such orthogonal projection. The range of useful angles is established using the angle at which the foci cross a line that represents the edge of the projection.

For example, in existing designs using acrylic lens material, the line is typically crossed at about 30°, yielding a better than 45° viewing range for images. Each image becomes stable with a rotation of about 6°. If the range were very small, the viewer would be challenged to maintain the orientation over an angle much less than 6° or the design would be required to reduce the repertoire of images to fewer than eight. It can be useful to think of this in reverse. That is, determine the angles of regard that correspond to desired selection points. The viewer can easily and unnoticeably vary an angle of regard by a few degrees. Consequently, the set of angles of regard are not required to form a linear series.

Two cross sections have been used in industry, circular and parabolic. The circular cross section has only a single parameter, the radius, which is typically greater than D/2. The choice of a radius determines the constant of proportionality that makes formula [1] into an equality. The reason the radius is greater than D/2 is that adjacent lenses meet at an angle that must be fabricated. Were the radius exactly D/2, the angle would be an impractical 0°. For simplicity of discussion, all dimensions are normalized by dividing by D/2.

After normalization, the viewer's eye is typically 3000 units or more away. From the point of view of an individual element, the change in angles of regard across the element can be neglected. This is not true from the point of view of the array, and the stripe design accounts for this difference. The circular cross section in these normalized units is defined by $x^2+y^2>1$. To analyze the focusing power, a normal to the surface is used to apply Snell's refraction law. The angle of the normal to the circular surface is $\arctan(y/x)$.

To apply the solutions disclosed in U.S. Pat. No. 5,642,226, a parabolic cross section is defined by the less familiar: $y=k(1-x^2)$, which is presented in the same normalized units. Unfortunately, U.S. Pat. No. 5,642,226 does not teach the range of the parameter k over which the preferred solution exists. The angle of the normal to the parabolic surface is $\arctan(1/2\,kx)$. The refractive analyses depend on the parameter k. Mathematically, a parabola is a line that is equidistant from a point (e.g., 0, $k-k/4$) and a line ($y=k+k/4$) which are commonly termed as the focus and the directrix, respectively. In U.S. Pat. No. 5,642,226, k is positive definite or greater than zero. Because of practical considerations in constructing a lens array, the range of x for these normalized units is −0.8 to +0.8, which allows 10% of the skirts of the lens for molding or extrusion tolerance. Symmetry allows for considering the range of 0.0 to +0.8 for x and positive angles of incidence with respect to a normal to the array. Snell's law is applied assuming that the index of refraction of the plastic material is 1.45 which is in the range for common acrylics. Better designs could be realized with a higher index of refraction materials such as those that are used in plastic lenses for spectacles which are considered cost prohibitive. The following table presents some critical data used in the refractive analyses of the lens array in U.S. Pat. No. 5,642,226.

TABLE 1

Angle of the orthogonal for a circle and example parabolas in degrees

| x = | 0 | 0.20 | 0.40 | 0.80 |
|---|---|---|---|---|
| Circle | 90 | 78.46 | 66.42 | 36.87 |
| k = 2 | 90 | 51.34 | 32.01 | 17.35 |
| k = 1 | 90 | 68.20 | 51.34 | 32.01 |
| k = 0.5 | 90 | 78.69 | 68.20 | 51.34 |

Refractive analysis proceeds as follows: a ray makes an angle with respect to the normal to the surface of the array. From Table 1, the angle the ray makes with respect to the orthogonal is calculated. From Snell's law, the angle of the ray inside the dielectric is calculated (for example, the acrylic) with respect to the orthogonal from Table I. The result of the analysis is that for larger values of k, the thickness of the array is reduced as suggested in U.S. Pat. No. 5,642,226. However, the accuracy of focus is substantially inferior. For large values of k, all hope of presenting eight distinct images to the viewer is lost. As the parameter k is decreased, the focusing power of the lens improves dramatically. However, concomitant with that improvement, the focal plane is no longer improved. Moreover, the angular range is restricted rendering the selection angle range extremely small (much less than 45°).

The numeric results of refractory analysis of the lens array of U.S. Pat. No. 5,642,226 are provided in Table 2. Each parabola and the circular case have been analyzed with incident rays every 5°. The average value of x is reported. If x is in the range of −1 to 0, it is within the orthogonal projection of the lens on the focal plane. An x value of less than −1 signifies that the angular range has been exceeded. Referring to the data for k=2, the range available for the presentation of an image sequence is less than ±5° or a total range of less than 10°. Such a small range is unsatisfactory for presenting a reasonable sequence of images. On the basis of this criterion, k must be in the range of 0.5 to 1.0, and the available range for a parabolic cross section is less than 30°. For many applications, this value of k is satisfactory. The rows titled SD (x) are the standard deviations of the values of x taken over a range of ray intersection points. This number measures the ability of the lens to select the correct image at high contrast. An ideal solution would have a 0 standard deviation. On the basis of standard deviation, k=1 can be ruled out because $x(10°)−SD(x, 10°)<x(5°)+SD(x, 5°)$ resulting in focus lines that significantly overlap to reduce contrast. The overall relative thickness of the array is k−opt (y) for parabolic designs and 1−opt (y) for circular designs. Unless the parabolic array is addressed through an aperture that avoids intersecting the array on the skirts of the parabola, the optimum thickness for best foci exceeded the substantially circular design point.

TABLE 2

Results of the analyses of U.S. Pat. No. 5,642,226

| Parabola | Angle | 5° | 10° | 15° | 20° | 25° |
|---|---|---|---|---|---|---|
| k = 2 | x | −1.24 | −1.55 | −1.91 | −2.31 | −2.75 |
|  | SD (x) | 0.30 | 1.62 | 1.94 | 2.31 | 2.74 |
|  | opt y | −2.31 | −2.55 | −2.78 | −2.99 | −3.15 |
| k = 1 | x | −0.64 | −0.92 | −1.23 | −1.56 | −1.91 |
|  | SD (x) | 0.62 | 0.80 | 1.01 | 1.26 | 1.54 |
|  | opt y | −2.38 | −2.59 | −2.77 | −2.91 | −3.00 |
| k = .5 | x | −0.47 | −0.81 | −1.18 | −1.55 | −1.92 |
|  | SD (x) | 0.30 | 0.44 | 0.61 | 0.81 | 1.03 |
|  | opt y | −3.66 | −3.89 | −4.06 | −4.15 | −4.17 |
| k = .4 | x | −0.48 | −0.86 | −1.27 | −1.68 | −2.08 |
|  | SD (x) | 0.25 | 0.39 | 0.55 | 0.75 | 0.96 |
|  | opt y | −4.43 | −4.67 | −4.84 | −4.91 | −4.90 |
| Circle | x | −0.08 | −0.27 | −0.46 | −0.65 | −0.83 |
|  | opt y | −1.75 | −1.82 | −1.85 | −1.85 | −1.80 |
|  | SD (x) | 0.13 | 0.14 | 0.14 | 0.13 | 0.11 |

U.S. Pat. No. 5,642,226 offers another solution wherein the transparency is achieved by introducing a parallel concave lens array in the back surface of the primary array. The concave lens is constructed to have a negative focal point equal to the positive focal point of the front-surface lens. This combination allows an image behind the array to be viewed by the observer. In optics, a concave-convex lens is referred to as a meniscus lens. Such a lens can be positive or negative depending on the focal points of the convex and concave surfaces. The normal assumption is that the lens is thin. That is, the thickness of the lens is much less than either focal length.

In U.S. Pat. No. 5,642,226, the requirement is that the convex lens sharply focus the incoming light rays to perform a critical selection function. As a result, the concave portion of the array perforce substantially focuses light at the intended "see through" angle before striking the concave lens. This combination does not act as a thin, zero-magnification meniscus lens. The negative lens does allow the transparency objective to be realized. However, an undistorted view of the image positioned behind the array is available only on a precisely placed plane. Three-dimensional objects are unfortunately distorted. The position of the plane bears a fixed relationship to the thickness of the primary array. If the primary array is on the order of 0.015 inches, thick, the rear image must be less than 0.1 inches from the rear of the primary array for best foci.

U.S. Pat. No. 5,642,226 further suggests that a lens system can be realized using diffraction rather than refraction for the objective of an anisotropic lens array that acts as a window over a set of angles of regard and produces a second image or sequence of images over another set of angles of regard. The fundamental principle is that a transparent object when illuminated by a coherent light produces a spatial distribution of light amplitudes that characterize the object. If a cylindrical lens is so illuminated, the lens gives rise to a set of refracted spherical waves, one corresponding to each point of the lens. Since the illumination is coherent, each wave of the set of refracted spherical waves is mutually coherent and produces an interference or diffraction pattern determined by the relative refraction of every point in the lens. The pattern is characteristic of the lens. Generally, the pattern is captured in a photosensitive emulsion. Since photosensitive emulsions are sensitive to light intensity and not the amplitude variations produced by the diffraction pattern, the emulsion is illuminated with a reference beam that is coherent with the beam that illuminates the lens in addition to the light that characterizes the object. This is referred to as a phase-reference hologram and represents the most effective way to realize such a lens. Diffraction-based lenses such as the one described in U.S. Pat. No. 5,642,226 and earlier devices such as Fresnel zone-plate lenses are rarely seen in optical devices for managing incoherent white light since the quality of performance of the diffraction pattern depends strongly on the wavelength of light.

U.S. Pat. No. 5,642,226 further suggests that a lens system can be realized using the Fresnel lens technique when designing lenses for the objective of an anisotropic lens array that acts as a window over a set of angles of regard and produces a second image or sequence of images over another set of angles of regard. The imaging of lenses depends primarily on the surface curvatures of the surfaces of the dielectric rather than the thickness of the dielectric material. The focusing effect of a normal lens can be obtained in an optical element if the surfaces are divided into small elements and these elements are brought together in a common plane that is normal to the optical axis. This is referred to as the Fresnel lens technique. Such lenses are termed "Fresnel lenses". Unfortunately, breaking up the aperture of a lens into small zones destroys the continuity of the wave front. Therefore, such lenses do not provide high performance or clarity of image. The technique is useful where high performance is not necessary and/or where the thickness of the lens is paramount.

A high zone count Fresnel lens and a Fresnel lens that features the actual surface shape of the lens being simulated as opposed to the more easily fabricated linear approximation will be required to apply the Fresnel lens technique to situations where the image repertoire is in the typical range of eight. For directly viewed anisotropic lens arrays where the viewing distance is approximately 18 inches, the preferred lens width is 0.01 inches or less. For a circular cross section lens for this viewing distance, the overall thickness is approximately 0.015 inches. The maximum thickness saving using the Fresnel lens technique is less than 0.05 inches. The saving approaches 0.05 inches as a limit as the number of zones increases. As the number of zones increases, the precision of the die from which such arrays are fabricated perforce increases as does the fabrication cost. For ten zones, the die precision increases at least threefold. To effectively select from a repertoire of eight images, each image's angular range should be sampled by at least two, preferably three zones. This implies that at least sixteen, preferably more zones are required even further exacerbating die complexity and molding costs. Solutions based on the Fresnel technique are best applied to a long viewing distance array with limited image repertoires. For example, for a 300-foot viewing distance, the preferred lens width is 2 inches and the array thickness is approximately 3 inches. Saving 30% of the material given, a300-foot design point may justify the Fresnel technique. In such billboard applications, a lens' array can be assembled in situ by abutting array segments that are several feet wide and tens of feet long. Unfortunately, for most applications, the Fresnel technique is contraindicated.

U.S. Pat. No. 5,642,226 further suggests using a transparent dielectric, such as acrylic, with the viewer side printed with opaque stripes and the far side printed material sampled by stripes of the pitch, aligned with the viewer side stripes. Over one range of angles of regard, the viewer observes the clear portion of the back of the device interstitial to the opaque front side stripes. Over another range of angle of regard, the viewer observes the printed image on the back side of the device interstitial to the opaque front side stripes. This simple device is suitable in the situation where there is a desire to see a single image or a window depending on the angle of regard. Provided the spacing of the opaque stripes are small compared to the viewing distance (1:1000 or better) and the thickness and index of refraction of the plastic sheet are appropriately chosen so that the refraction limited angular range is not a concern. Unfortunately, this device cannot encompass a sequence of images that appear as the angle of regard changes.

U.S. Pat. No. 4,541,727 introduces voids into an image affixed to the backside of a standard lens array. The array can permit the viewer to see a first predetermined image printed on the backside of the array or, over another range of angles of regard, see an object behind the array. If the image behind the array were a watch (the example used in U.S. Pat. No. 4,541,727), at several times of the day the hands of the clock are positioned at right angles, for example, 3 o'clock. One hand aligns with the axes of the cylindrical lenses of the array and becomes visible. The other hand, being at a right angle with the first hand, is aligned at a right angle with respect to the array. This hand is out of focus since the foci are perforce on the backside of the array. Further, this hand is optically segmented by the array of lenses. Experimentally, this hand is so distorted in view as to disappear entirely.

U.S. Pat. No. 5,644,431 discloses a first structure that is substantially similar to one of the structures in U.S. Pat. No. 5,642,226 and previously discussed hereinabove. U.S. Pat. No. 5,644,431 acknowledges the distortion of see-through image and designs a focal length of a negative lens to assure that the emerging rays are substantially parallel. This solves the problem found in U.S. Pat. No. 5,642,226 of the requirement for a precise and generally very small distance of the see-through image from the back of the array. The assertion is that the distortion is tolerable since the distortion amounts to graininess in one dimension of the object behind the array. The array will demagnify the see-through image in one dimension but not the other. U.S. Pat. No. 5,644,431 also discloses an array of spherical micro lenses. The back side of the array contains an array of spherical micro lenses in one to one correspondence with the front side. The lenses on both sides of the array are positive or convex. U.S. Pat. No. 5,644,431 suggests that two plano-convex array sheets should be fabricated and then aligned and bonded together to form the final array. The back side is no longer suitable for imprinting images due to the back side lenses. Further, achieving see-through with the array disclosed by U.S. Pat. No. 5, 644,431 is undermined because the back side is out of focus with respect to the front side lenses.

What is therefore needed is a high performance lenticular system that provides an image sequence as a viewer's angle of regard changes. Further needed is a lenticular system that provides the same repertoire of images as conventional optical systems with the introduction of a window mechanism for viewing objects located behind the array at a particular angle of regard. Further needed is a lenticular system that may be manufactured using non-complex dies and inexpensively molded and that provides an image sequence using a micro lens array wherein a printed image may be laminated or otherwise affixed to a back side of the array.

SUMMARY OF THE INVENTION

The invention consists of a periodic array of miniature lens-structures that are formed using a transparent material. In a first embodiment, the array consists of cylindrical plano-convex microlenses arranged in a regular one-dimensional pattern. A convex portion of each lens has a substantially circular cross section. The convex portion is incomplete, having a flat portion or a distributed periodic array of flat elements that interrupt the long cylindrical plano-convex lenses parallel to the plane of axes of the lenses. The substantially circular cross section portions of each micro lens have a common center. In one embodiment, a sequence of two or more (preferably eight) images are presented that appear as the viewer changes an angle of regard over a range of less than 60°, typically less than 45°. The periodicity of the micro lens elements depends on a pre-determined viewing distance. For example, at normal viewing distances for reading of 18 inches, the cylindrical elements would be preferably 100 elements to the inch or more. Each lens element brings a slice of an underlying printed image into focus. At viewing angles of regard that are approximately "see-through" angles, the invented micro-lens array is transparent and brings a sufficiently illuminated scene behind the device into view.

The underlying printed image is composed by a computer program from a desired image sequence array optics and viewing geometry. The printed image differs from known optical systems by using periodic voids that align with the flat portions of the lens array. Without the array of lenses, the printed image appears to be a set of stripes that run orthogonally to the axes of the lenses with the multi-image stripe periodicity equal to the lens periodicity but divided into image specific stripes by the number of images in the image sequence with the exception of the void areas. For example, if there were eight images in the image sequence and the lenses were at 100 per inch, there would be eight stripes in 0.01 inches, one for each image. The viewer sees the intersection of the focused stripe due to the lens and the printed stripe unless viewing the array at the approximate see-through angle of regard. If the see-through angle of regard is not normal to the surface of the array, the void areas are offset from the flat sections in the array and refraction at the planar surface must be considered. For example, if the offset were 5°, the rear image offset would be arcsin(n sin (5°)) where n is the index of refraction of the dielectric. In one embodiment, it is assumed to be 1.45. This results in an exit angle of 7.2° or an unnoticeable scene offset of 2.2°. However, if the offset were 25°, the exit angle would be 37.8° and the 12.8° shift would be very obvious in appearance. In some packaging applications, an intentional offset can help realize objectives. It is an advantage in of the overall array to diffuse some offset such that the overall transparency is maintained from a single angle of regard with respect to the center of the array. For example, when a zero offset is desired in the center of the array and that gradually changes above the centerline below the center and below the centerline above the center, at the design viewing distance the invented array has maximum transparency when viewed orthogonally, directly above the center of the invented array. A limitation on a single radius design is that the radius must be greater than half the width of the micro lens. In some circumstances, particularly when the aperture (percent clear) exceeds about 20%, it is a disadvantage to lose the top portion of the lens when viewed in cross section.

In a second embodiment, the cylindrical portions of the lenses that form the lens array have different centers for the right and left hand (as seen in cross section) substantially circular portions. With modest transparency requirements, a full repertoire of eight images is easily accomplished. Using two centers permits the lens radius to be equal to or less than the overall lens width. The thickness of the array depends directly on the radius, so such designs are inherently thinner. Additionally, the angles of regard that correspond to the elements that are addressed can be increased. This embodiment provides somewhat greater transparency for equal repertoires of images and image quality.

In a third embodiment, the flat segment is not continuous when the lens is observed in cross IQ section. A portion of the flat portion is located in the center. However, a fourth of the overall flat portion is presented on each lens skirt. The focus region is thus moved substantially toward the lens. The lens radius can be smaller than in the second embodiment. In this embodiment, the invention thickness is inherently the thinnest of the three embodiments.

In a fourth embodiment, ordinary lens designs are alternated with a flattened lens in a checkerboard pattern. This permits ordinary lens and image designs with up to an aperture percentage of 40.

In a fifth embodiment, the lens is no longer symmetric in cross section. One side of the lens consists of a flat surface at an angle with respect to the horizontal plane (horizontal in cross section not in the viewer's hands). If angles of regard that are normal ±45° to the arcuate portion of the lens are positive, then negative angles will intersect the flat portion. This embodiment differs only due to the fact that the window segments are not coplanar with the axes of the cylindrical elements. The window element may be a secant in cross section or longitudinal. The void portions in the printed image may be aligned such that the window portions are intended to be viewed orthogonally or an offset design may be used. In any case, refraction at the planar surface becomes more critical since substantial image offset is possible even with normal viewing of the tilted window segments. In fact, a limiting configuration exists wherein the array becomes opaque due to total internal reflection, when n sin ($\alpha$)=1; $\alpha$ is the angle at which the line of sight strikes the planar surface. In one embodiment where index of refraction is 1.45, $\alpha$=43.6°.

OBJECT OF THE INVENTION

The object of the invention is to provide an advertising medium for use in retail store windows with optical properties that draw the attention of customers by offering a display of a repertoire of two or more images from the viewer-side without losing outside awareness through the window regardless of whether the viewer-side faces inward or outward.

Another object of the invention is to provide a device that presents a repertoire of images differently to the right and left eye of the viewer to yield a perception of depth, or to present the standard optical effects of morph, motion, flip or zoom.

Another object of the invention is to provide a device that acts as a one-way window wherein viewers on a lenticular side of the window can view the room beyond while viewers on the backside of the array cannot see through the device.

Another object of the invention is to provide a device with optical anisotropy that can be used as antiglare screens for computer monitors including flat panel monitors, viewing security for computer monitors including ATM monitors, antiglare dashboard displays, antiglare cockpit displays and any other application of a display where control ambient illumination is difficult.

BRIEF DESCRIPTION OF THE DRAWINGS

The foregoing and other objects will become more readily apparent by referring to the following detailed description and the appended drawing in which.

DETAILED DESCRIPTION

Figure 1:
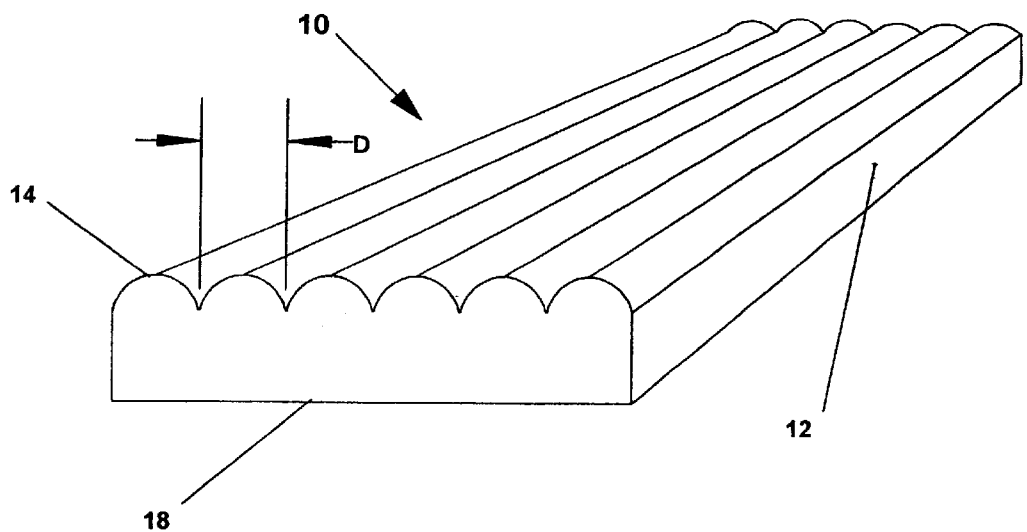
FIG. 1 is a perspective view of a portion of a known lenticular array.

Referring to the drawings, FIG. 1 is a perspective view of a portion of a known lenticular array 10. The array 10 has lens elements 14 that are cylindrical lenses with a circular cross section. The width of each lens is D. The lenticular array consists of a dielectric medium 12 with multiple convex lenses 14 formed on a viewer side. The dielectric medium may be any transparent material, but is typically a clear plastic having good mechanical properties. The planar side of the array 18 contains a printed image that is commonly designed by a computer to be addressed by the array 10 and variation in a viewer's angle of regard.

Figure 2:
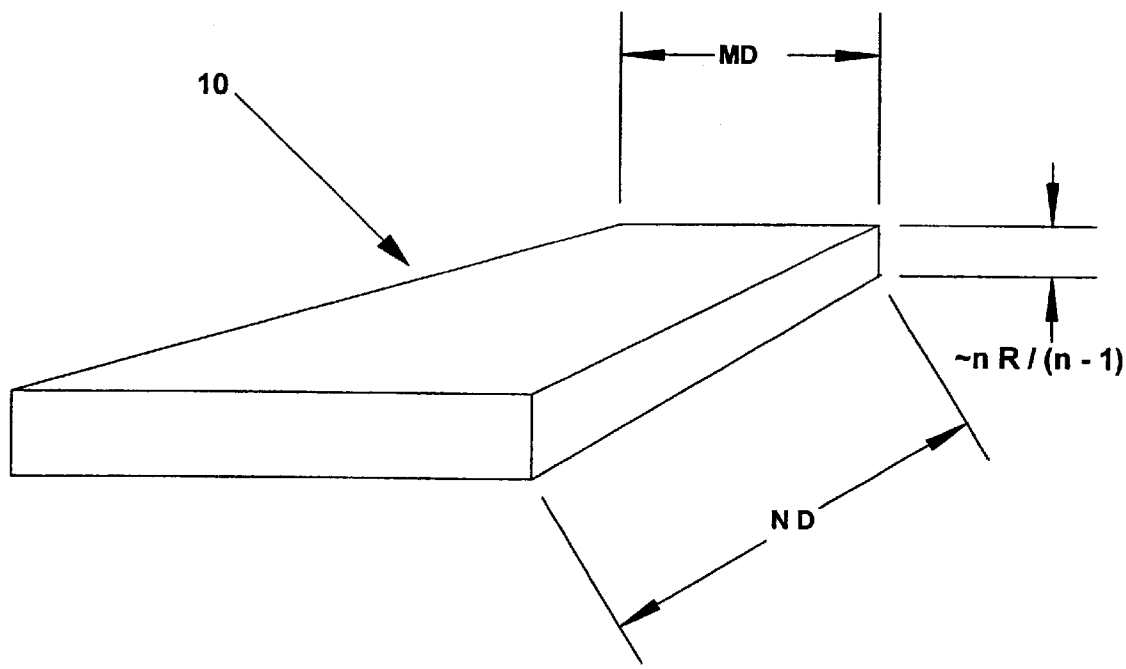
FIG. 2 is a perspective view of a known lenticular array.
Figure 3:
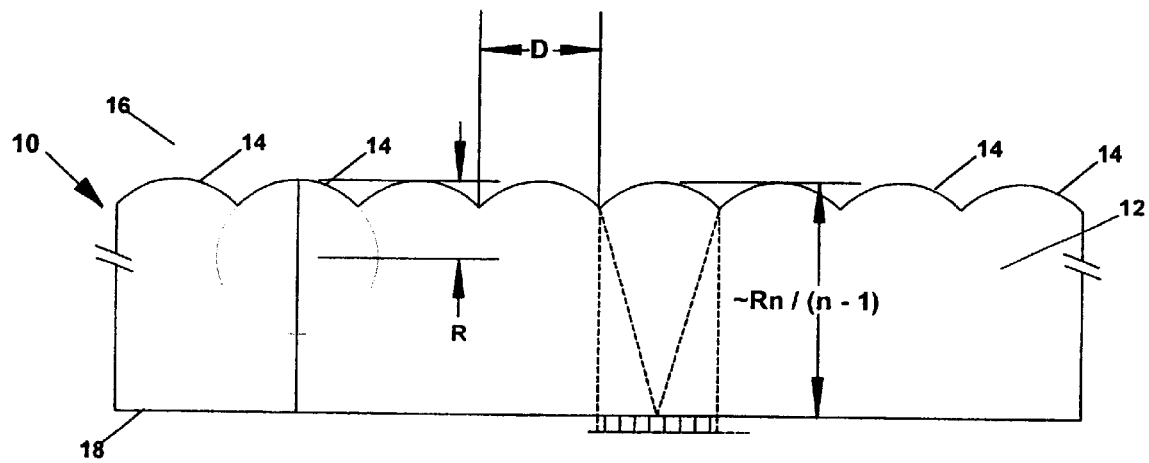
FIG. 3 is a cross-sectional view of the lenticular array shown in FIG. 1.

FIG. 2 is a perspective view of the complete lenticular array 10 of which a portion is shown in FIG. 1. FIG. 3 is a cross-sectional view of the lenticular array 10 shown in FIG. 1. The array 10 comprises a sheet of material with dimensions MD×ND×~nR/(n−1) where D is the width of a lens element 14 as best shown in FIG. 3, n is the index of refraction of the plastic material, R is the radius of the lens element 14 and R≧D/2. M and N are product variables. In one example where a button that flips from a picture of a general to the slogan "I like Ike", M and N may be on the order of 50 to 100. For an 8½×11 inch page, M and N may be on the order of 850×1100 or more. The actual dimension D depends on the design viewing distance and quality objectives.

The transparent material is commonly formed as a sheet with a lens array formed on a front side 16, or a viewer side. The back side 18, or flat side, is considered a non-viewer side. The radius of the substantially circular cross section, R, is shown larger than the lens spacing D. The overall thickness of the array is:

$$\text{Thickness} \approx \frac{R \times n}{(n-1)} \quad [2]$$

where n is an index of refraction for the dielectric medium. The backside 18 is printed with an appropriate computer-generated image that is aligned with the lens array 10 thereby enabling the viewer to see a repertoire of two or more, typically eight, images depending on the viewer's angle of regard.

Figure 4:
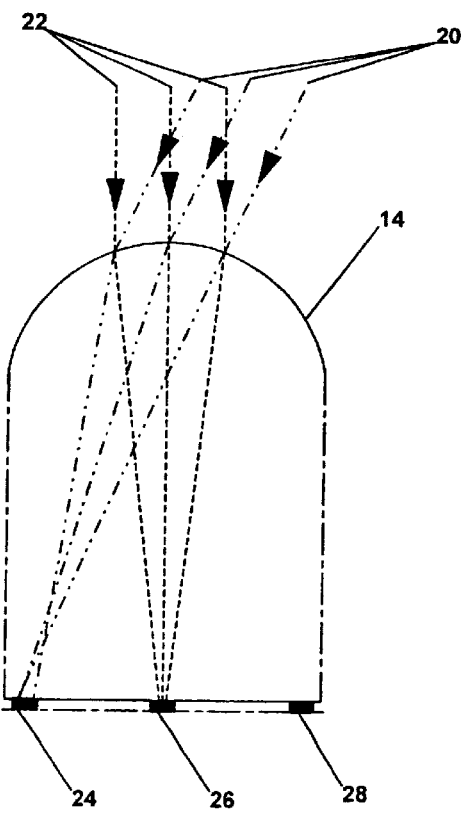
FIG. 4 is a cross-sectional view of a lens element of the lenticular array shown in FIG. 1.

FIG. 4 is a cross-sectional view of the lens element 14 of the lenticular array 10 shown in FIG. 1. Since the viewer's eye is on the order of 4,000 times the radius of the lens cross section, an individual lens can be analyzed with negligible error by assuming that light rays at a first angle 20 and light rays at a second angle 22 are parallel. The lens 14 focuses the rays from a repertoire of angles onto a repertoire of printed regions. The light rays from the first angle 20 focus on a printed region 24. From symmetry, light rays at an angle that is negative with respect to a perpendicular to the array 10, if the angle 20 is defined as positive, focus on an area 28 that is mirrored from the center line of the lens 14. Light rays from the second angle 22 focus on and therefore select a second, independent area 26. If the repertoire of images has a defined number, the lens 14 must be capable of adequately focusing on a same number of independent areas. The actual repertoire of angles need not be a linear progression. If one marks off the projection of the lens 14 on the surface 18 in q centers where q is the number of images in the repertoire and then calculates the corresponding angles of regard, parallel rays at those angles must focus in a reasonably non-overlapping fashion on the surface at the best image plane compromise available. Non-compensated lenses will typically depart from the ideal. A measure of the quality of a lens is the standard deviation of a point from a spread of points that intersect the lens. If the standard deviation is such that focus areas overrun adjacent focus areas, the images seen will not be well defined in color and especially definition.

Figure 5:
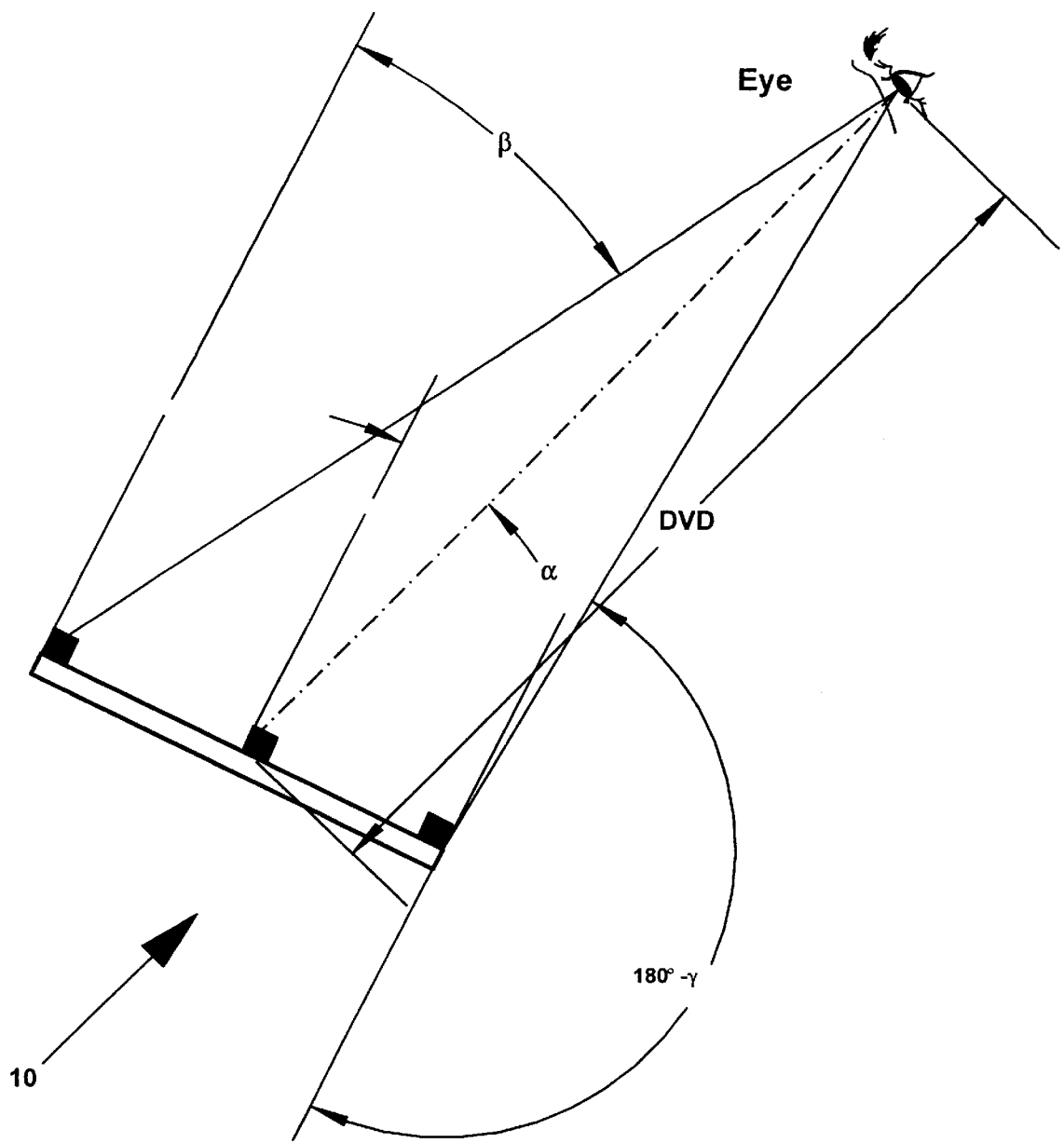
FIG. 5 is a side view of the lenticular array shown in FIG. 4 showing the geometry of the array.

FIG. 5 is a side view of the lenticular array 10 shown in FIG. 1 showing the geometry of the array. The distance from the eye of the viewer to the center of the array 10,DVD, is the design viewing distance. The lens spacing in the array 10 should be small with respect to DVD. Improvement in quality is noticeable up to a DVD/D ratio of 3400 that corresponds to 1 arc minute at the eye. Typical DVD/D ratios exceed 1000. For example, a common design point is DVD=18 inches and D=0.01-inches to provide a ratio of 1800. As previously mentioned, from the aspect of a single lens, the angle of regard with respect to a perpendicular to the lens 14 may be regarded a constant. From the aspect of the entire array 10, this angle varies continuously and critically from an angle $\gamma$ on a bottom of the array 10 to an angle $\alpha$ at a center of the array 10 to an angle $\beta$ on a top of the array 10. The computer-designed printed array uses these angular variations to design the underlying picture segments associated with each central angle of regard, $\alpha$. There may be eight principal angles of regard $\alpha$, corresponding to eight images. At each angle of regard, the gradual variation from $\gamma$ at the bottom to $\beta$ at the top are correlated with the desired image at that angle.

Figure 6:
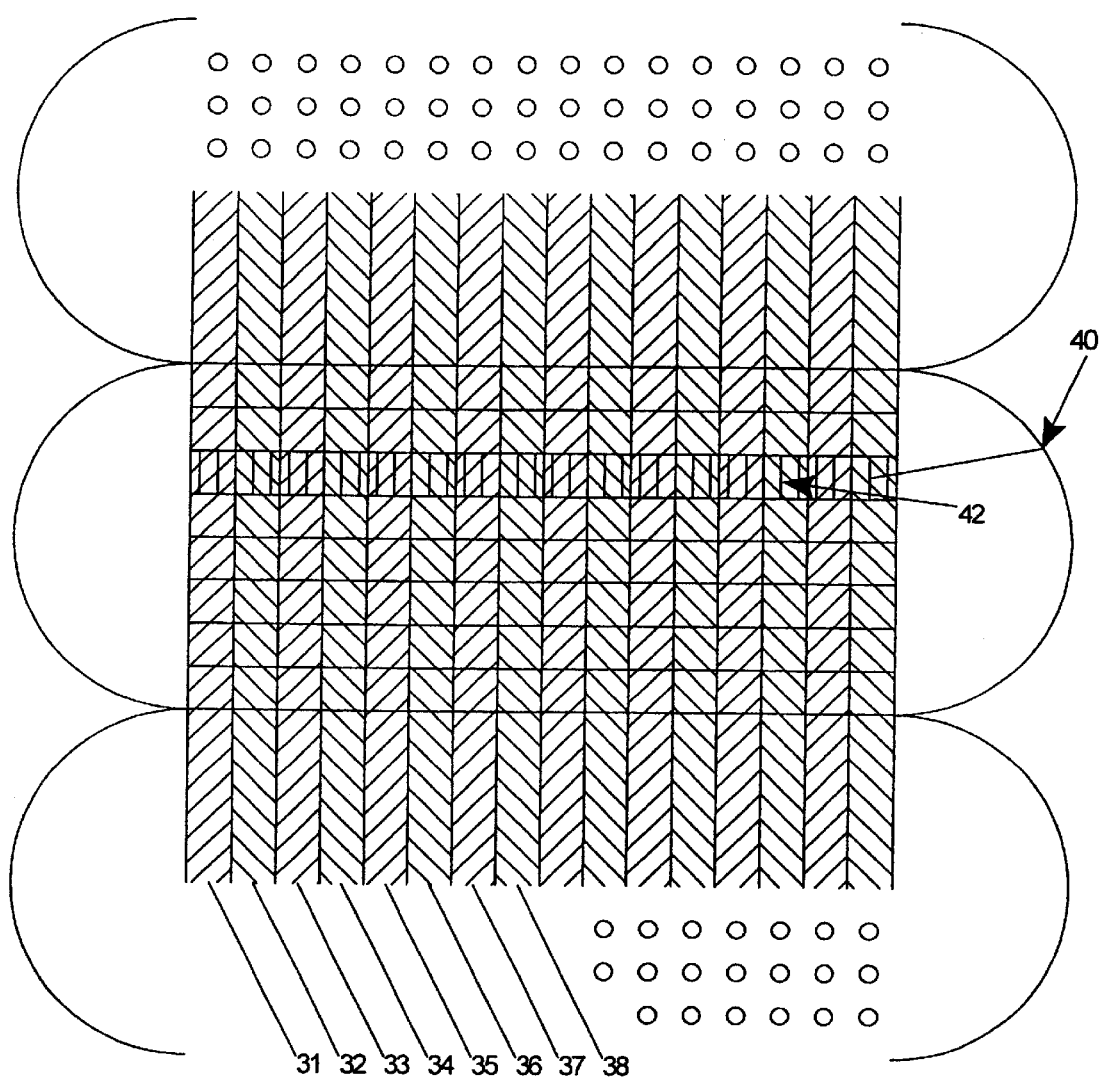
FIG. 6 is a detailed view of a known lenticular array showing image addressing.

FIG. 6 is a detailed view of a known lenticular array showing image addressing. As the angle of regard for a specific image varies from $\beta$ (FIG. 5) at the top of the screen to $\gamma$ (FIG. 5) at the bottom, the image which is printed in stripes 31,32,33,34,35,36,37, and 38 that run perpendicular to the axes of the cylindrical micro lenses vary in content. For a particular micro lens, the angle of regard intersects the surface of the lens at a point 40 and is focused on a stripe 42 of about 12.5% of the width of the lens that intersects the printed stripes. The stripe 42 is aligned to the array at printing. The orthogonal stripes blend and diffuse errors throughout the image as well as account for gradual shift in angles of regard from top to bottom at each selection angle.

Figure 7:
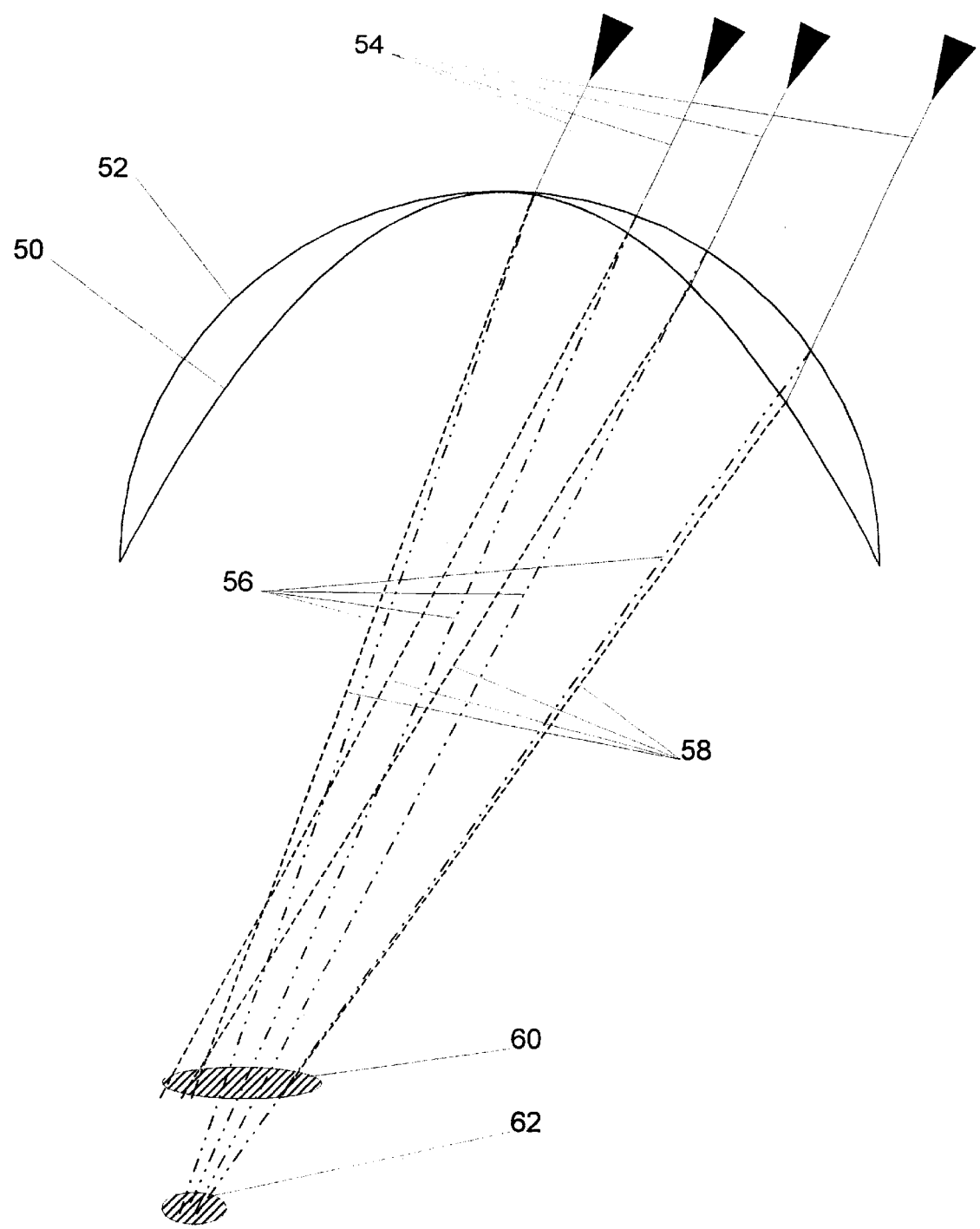
FIG. 7 is a cross-sectional view of a known circular lens element and a known parabolic lens element showing the addressing capability of the circular cross section in contrast with the (k=1) parabola cross section addressing capability.

FIG. 7 is a cross-sectional view of a known circular lens element and a known parabolic lens element showing the addressing capability of the circular cross section in contrast with the (k=1) parabola cross section addressing capability. In this comparison, a set of rays 54 intersect a parabolic surface (k=1) 50 and a circular surface 52. For the parabolic shape, the leftmost rays 58 converge above a selected focal plane 60, however the rightmost rays 56 converge far below the selected plane 60. At the selected plane 60, the overlap of adjacent angles is unsatisfactory for a full repertoire of images. The situation improves for thicker designs, but never approaches the performance of a circular cross section 52.

Figure 8:
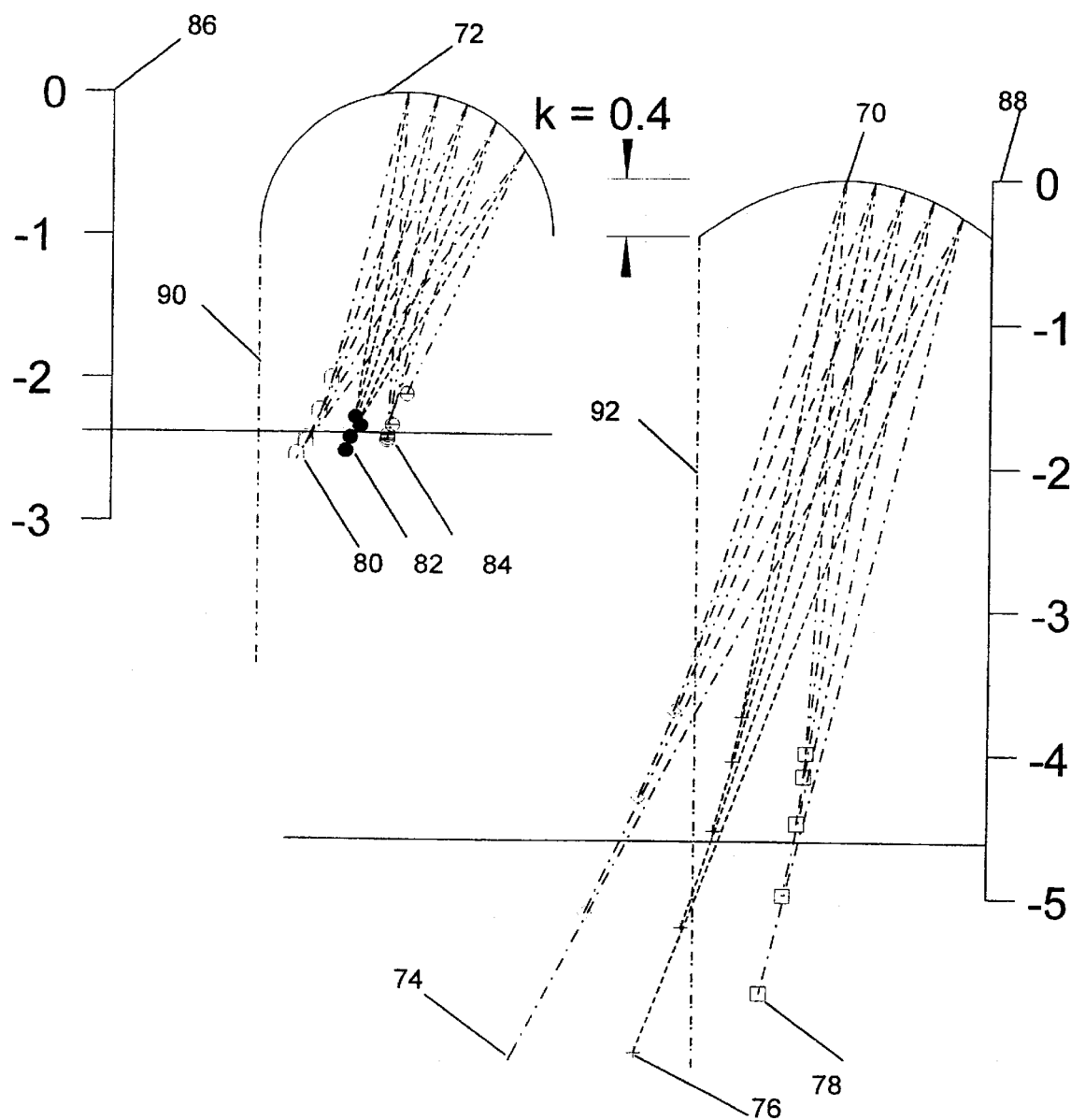
FIG. 8 is a cross-sectional view of a known circular lens element and a known parabolic lens element showing the addressing capability of the circular cross section in contrast with the (k=0.4) parabolic cross section.

FIG. 8 is a cross-sectional view of a known circular lens element 72 and a known parabolic lens element 70 showing the addressing capability of the circular cross section in contrast with the (k=0.4) parabolic cross section. At each angle of incidence for each point on the surface of the lens, an exemplary ray is traced to a marker. The marker is at the convergence of a ray at that angle striking the lens at a small distance to the right and a second ray at that angle striking the lens at a small distance to the left. In one example, the incident rays are at 5°, converging at $\ominus$ symbols 84 from the substantially circular lens 72 or □ symbols 78 from the parabolic lens 70. Incident rays at 10° converge at ● symbols 82 from the substantially circular lens 72 or + symbols 76 from the parabolic lens 70. Incident rays at 15° converge at ∩ symbols 80 from the substantially circular lens 72 or ◇ symbols 74 from the parabolic lens 70. In a physical device, a compromise focal plane must be selected. If the arithmetic average of the focal points is selected as the compromise focal plane, the best compromise is about −2.5 for the substantially circular case as shown on scale 86 or about −4.5 for the parabolic case shown on scale 88. While both lens designs are satisfactory for a small repertoire of images, the parabolic case does not provide a satisfactory design for a repertoire of eight images. A projection of the left side of the lens 90 for the substantially circular lens 72 remains to the left of the focal point for the incident rays at 15° 80 indicating that more than six positions are capable of adequate focus. Since the focal point for the incident rays at 15° 74 are well to the left of the similar projection 74 for the parabolic case the repertoire is clearly less than six. For parabolic designs with large values of k than the value of 0.4 used here, the situation is not improved. Another important consideration is the rotation angle between images in the repertoire. If this angle is too small, the viewer must maintain an unreasonably rigid angle of regard. The substantially circular case yields more than 4° between points for a repertoire of eight. If a repertoire of eight were forced on the parabolic use, only about 1° would exist between points.

Figure 9:
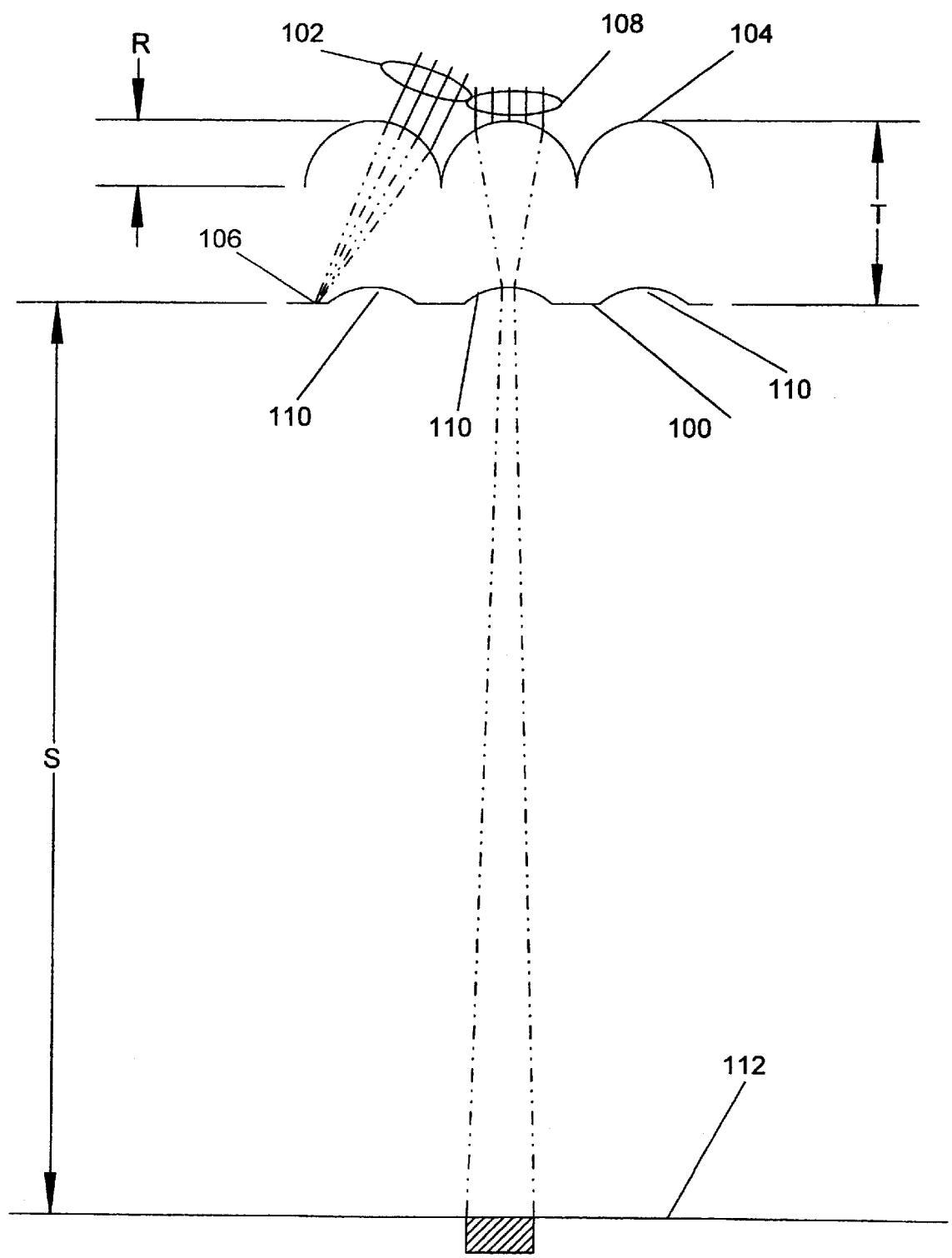
FIG. 9 is a side view of a known lens array having partial array transparency.

FIG. 9 is a side view of a known lens array 104 having partial array transparency. A repertoire of images 106 is imprinted on a backside 100 of the lens array 104 and addressed as previously mentioned hereinabove. The observer sees this sequence of images 106 at angles of regard typified by the set of a first set of rays 102. The thickness of the array, T, is related to the radius, R, and the index of refraction of the material. Over a second set of angles of regard 108, the rays are focused on a negative focal length cylindrical lens element 110. If the lens array 104 were approximately a thin meniscus lens and the focal length of the negative lens 110 were equal in magnitude to the focal length of the viewer-side lenses 104, the combined effect of these elements would be a window with substantially no focusing effect at all. Unfortunately, in order for the positive lens to bring the repertoire images 106 into focus, the printed side of the array must have a fixed distance from the viewer side. Therefore, the intended window rays are substantially focused before striking the negative lens 110. These rays perforce diverge when emerging from the [fill in this blank]. The alternative is to adjust the negative lens 110 so that the rays emerge parallel. However, this produces an effect somewhat similar to looking backwards through a telescope. Unfortunately, the known lens array 104 utilizes cylindrical lenses. This demagnification results in distortion.

This prior art apparatus unfortunately restricts the placement of the "see-through" image to a fairly precise location behind the array. The focal plane for the window effect S has a fixed relationship to the array thickness T. For typical, hand-held devices, this distance T is on the order of 0.1 inches.

Figure 12:
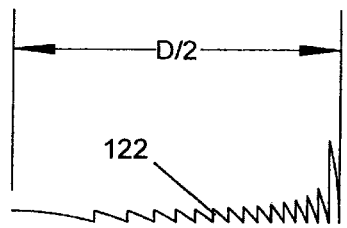
FIG. 12 shows a detailed view of a portion of the lens shown in FIG. 11.
Figure 11:
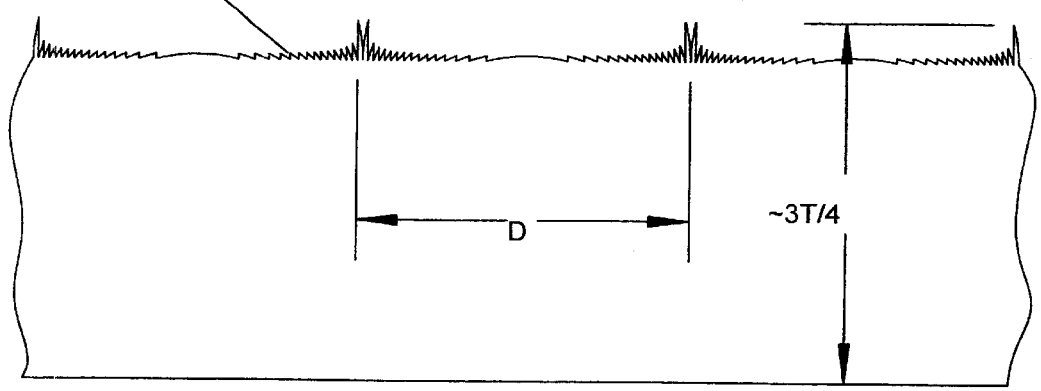
FIG. 11 is a cross-section of a known lens array having the Fresnel technique employed.
Figure 10:
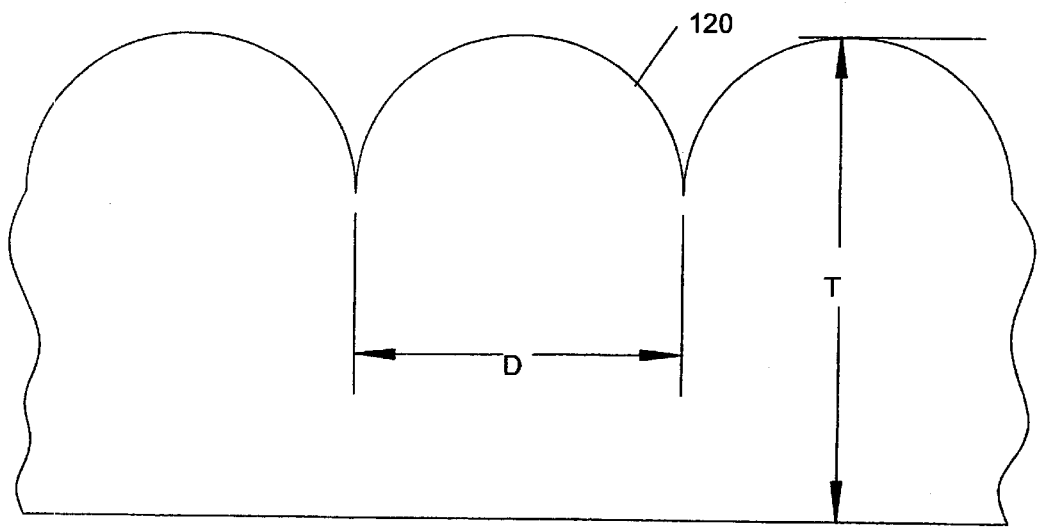
FIG. 10 is a cross-section view of a known lens array base design for implementation using the Fresnel technique.

FIG. 10 is a cross-section view of a known lens array base design for implementation using Fresnel technique. There are two Fresnel techniques employed by the industry. Both take a base lens and divide the lens into segments with a series of parallel lines. Typically, the line spacing varies with the square root of the integers. The lens curvature can be preserved using curved segments of the lens curvature, or the average slope of the lens between the parallel lines can be used using flat segments based on such average slopes. The resultant breaking up of the lens into small zones destroys the continuity of the wave front, and therefore such lenses do not provide high performance. The performance in this application is of questionable benefit except for arrays designed for very long viewing distance where the precision is a lesser concern and the material saving is more substantial. The arcuate surface of the base lens 120 is show n in FIG. 10. FIG. 11 is a cross-section of a known lens array employing the Fresnel technique. The lenses are approximated using the curved segment technique into Fresnel lenses 122. FIG. 12 is a detailed view of a portion of a Fresnel lens 122 shown in FIG. 11. The base lens in FIG. 10 has a thickness T based on the viewing distance and image repertoire requirements. In this particular design shown in FIGS. 11 and 12, a material saving of about 25% is realized. The Fresnel technique can be considered when the material cost saving exceeds fabrication cost increase. For most applications, this technique is not useful because distortion is too severe.

The present invention is a high performance lenticular system that provides an image sequence as a viewer's angle of regard changes. Further, the present invention is a lenticular system that provides the same repertoire of images as conventional optical systems with the introduction of a window mechanism for viewing objects located behind the array at a particular angle of regard. Further, the present invention is a lenticular system that may be manufactured using non-complex dies and inexpensively molded and that provides an image sequence using a micro lens array wherein a printed image may be laminated or otherwise affixed to a back side of the array.

In a basic form, the present invention is a substantially transparent sheet having anisotropic optical properties that includes a body of transparent material having a pair of opposing sides and an index of refraction substantially greater than one and a plurality of piano-convex lenses formed on and substantially covering one of the opposing sides. Each of the piano-convex lenses includes two elongate arcuate segments and at least one elongate substantially planar segment that interconnects the two elongate arcuate surfaces. Each of the piano-convex lenses has a substantially circular cross section and pre-determined dimensions based on a pre-determined distance between the transparent sheet and the viewer.

Figure 13:
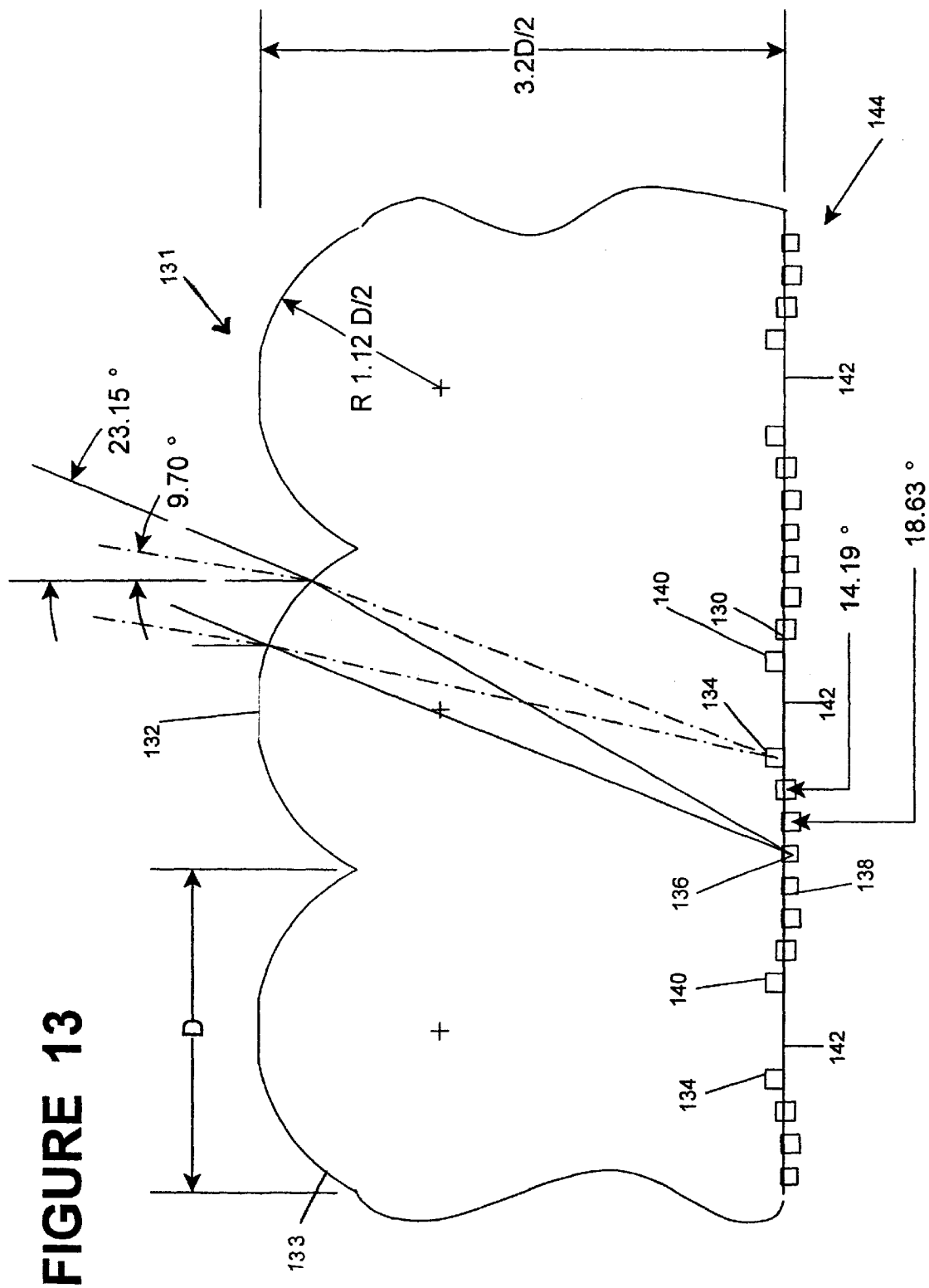
FIG. 13 is a cross section view of a portion of a first embodiment of a lens array according to this invention with a lens aperture of about 20%.

FIG. 13 is a cross section view of a portion of a first embodiment of a lens array 144 according to this invention with a lens aperture of about 20%. The intended focal points of each lens 133 representing the images in the repertoire have been calculated. Then, an optimum angle of incidence is found. The results are displayed as boxes 130. The center of each box 130 is at the average of both x and y dimensions. The standard deviation has been calculated and the width of the box 130 represents that value. An ideal lens would produce a result where each box was very small and the variation in the y dimension for all the boxes was zero. Touching or overlapping boxes indicate that image contrast is becoming unacceptable.

In this embodiment, each lens 133 has a flat segment 132 that is about 20% of the dimension D which depends on the design viewing distance. A repertoire of eight images has been targeted. A first image segment, or stripe, 134 is addressed by an angle of regard of about 9.7°, a fourth image segment, or stripe, 136 by about 23.15°, by symmetry, a fifth image segment, or stripe, 138 by about −23.15° and an eighth image segment, or stripe, 140 by about −9.7°. To produce window capability, the backside of the array 144 is clear between the first image stripe 134 and the last adjacent image stripe 140 thereby forming a clear area 142. The clear area 142 may be accurately aligned with the corresponding lens flat 132 or may be offset as the angle of regard, α, varies from γ to β, as shown in FIG. 5. The radius of the lens 133 when a single center is used for the right and left cross sections must be greater than D/2. The case where the radius is exactly D/2 is illustrated in FIG. 10. In FIG. 10, the adjacent lenses are exactly tangent, presenting an intractable molding problem. The radius in the FIG. 13 embodiment is about 1.12D/2. Since the thickness of the array is important for both materials' cost and especially flexibility of backside printing options, the radius is preferably kept as small as is consistent with image quality objectives and molding considerations. A tradeoff exists between the desire for a full repertoire with high contrast image sequences and a desire for transparency. The embodiment presented in FIG. 13 is reasonably excellent in contrast and repertoire, and offers about 20% transparency which may be marginal in some applications. The angular change between images is about 4.5° which is reasonable.

Figure 14:
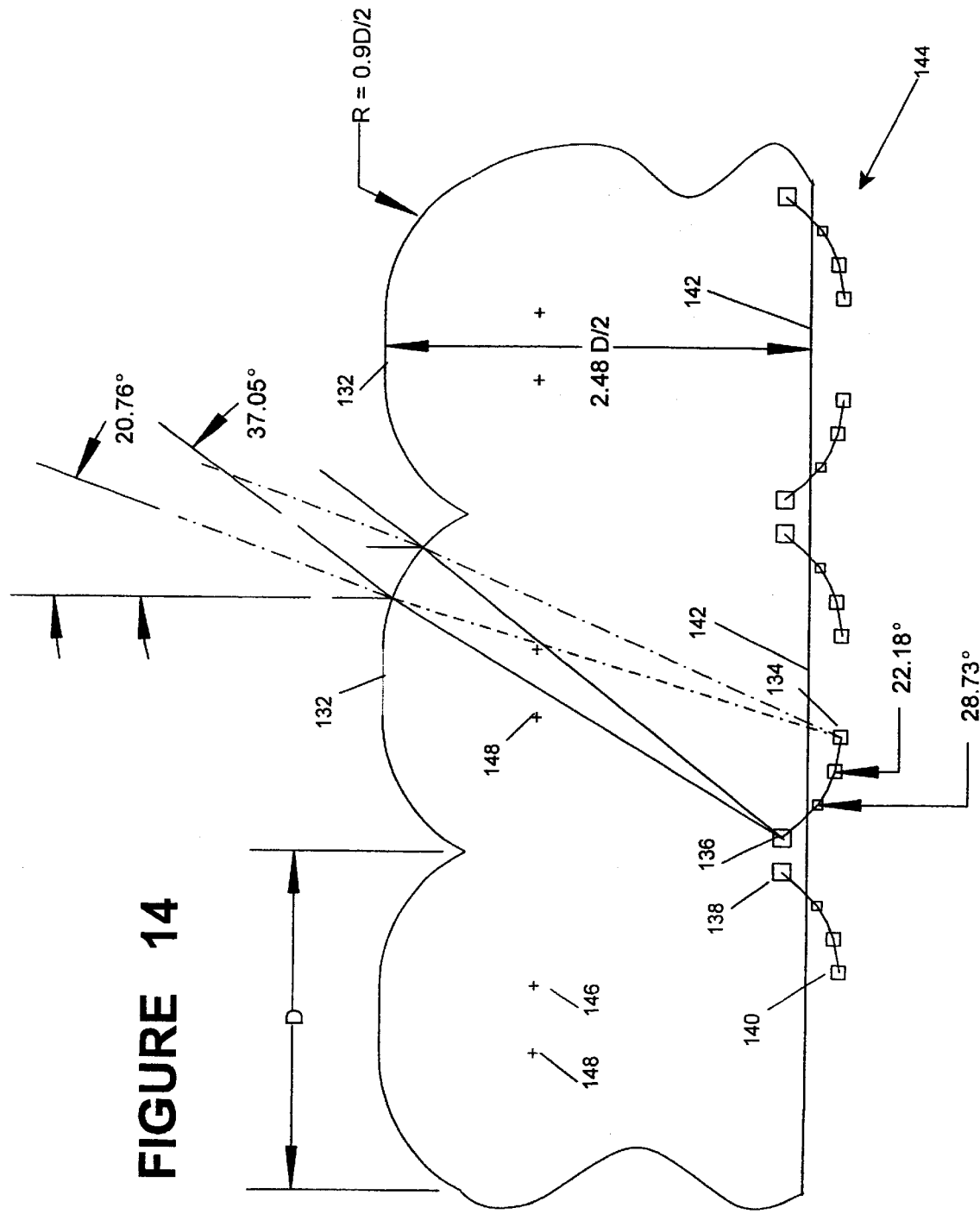
FIG. 14 is a cross section view of a portion of a second embodiment of a lens array according to this invention with a lens aperture of about 20%.

FIG. 14 is a cross section view of a portion of a lens array 144 according to a second embodiment of this invention with a lens aperture of about 20%. Instead of a single center for referencing the arcuate surfaces each lens of the lens array 144, two centers are used. The right arcuate segment is centered to the right of a right symmetry axis 146. The left arcuate segment is centered to the left of a left symmetry axis 148. The thickness of the array 144 decreases in this embodiment to about 2.48 D/2 from about 3.2 D/2 and the molding restriction has shifted and no longer requires the radius to exceed D/2. The average angular displacement between images in the repertoire is approximately 5.5°.

Figure 15:
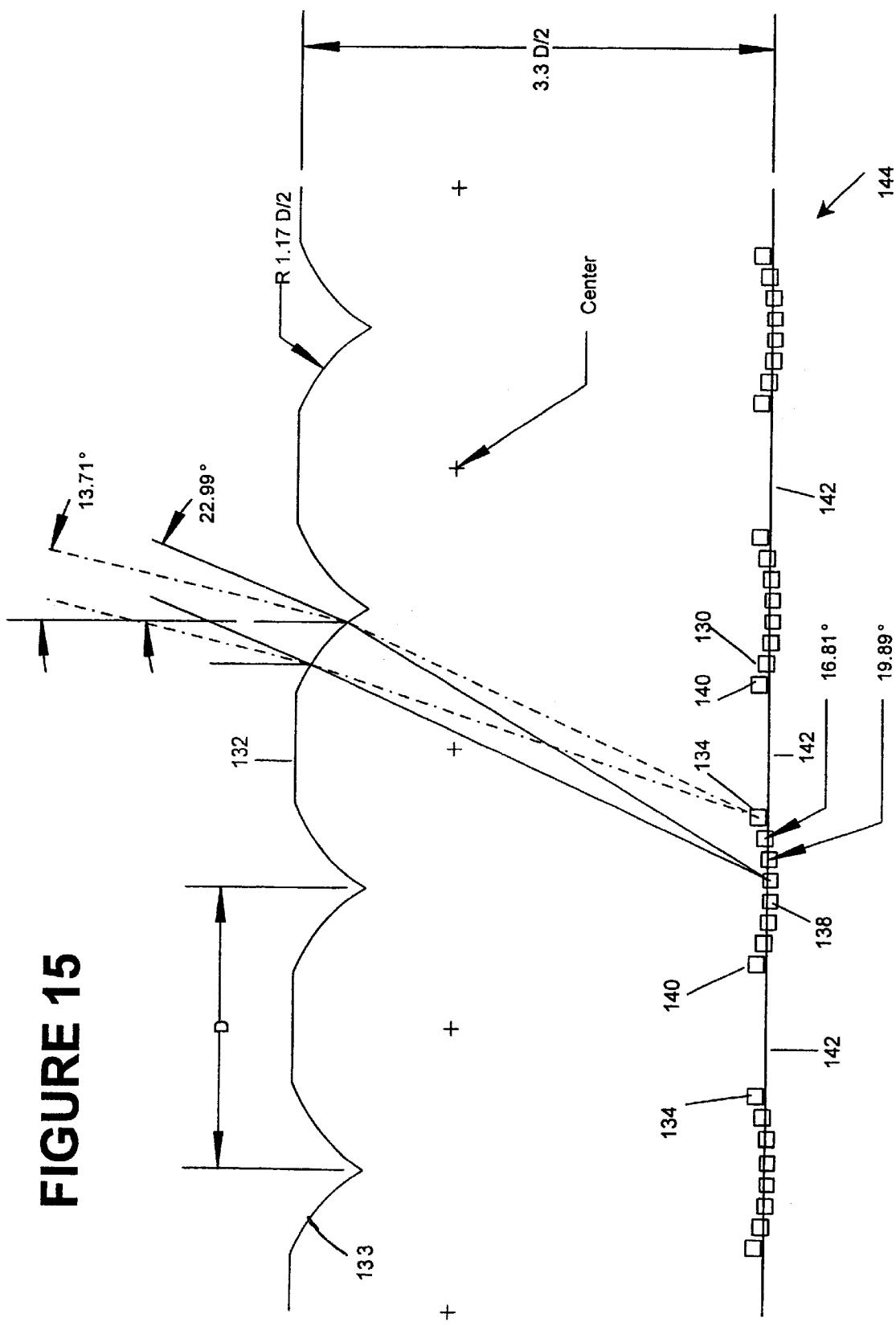
FIG. 15 is a cross section view of a portion of a third embodiment of a lens array according to this invention with a lens aperture of about 40%.

FIG. 15 is a cross section view of a portion of a lens array 144 according to a third embodiment of this invention with a lens aperture of about 40%. A single center axis is used for referencing the arcuate surfaces of each lens 133. The flat portion of the lens segment 132 is about 0.4 D rather than 0.2 D as shown in FIG. 13. The width of the clear portion 142 of the backside 144 is about 0.4 D.

Figure 16:
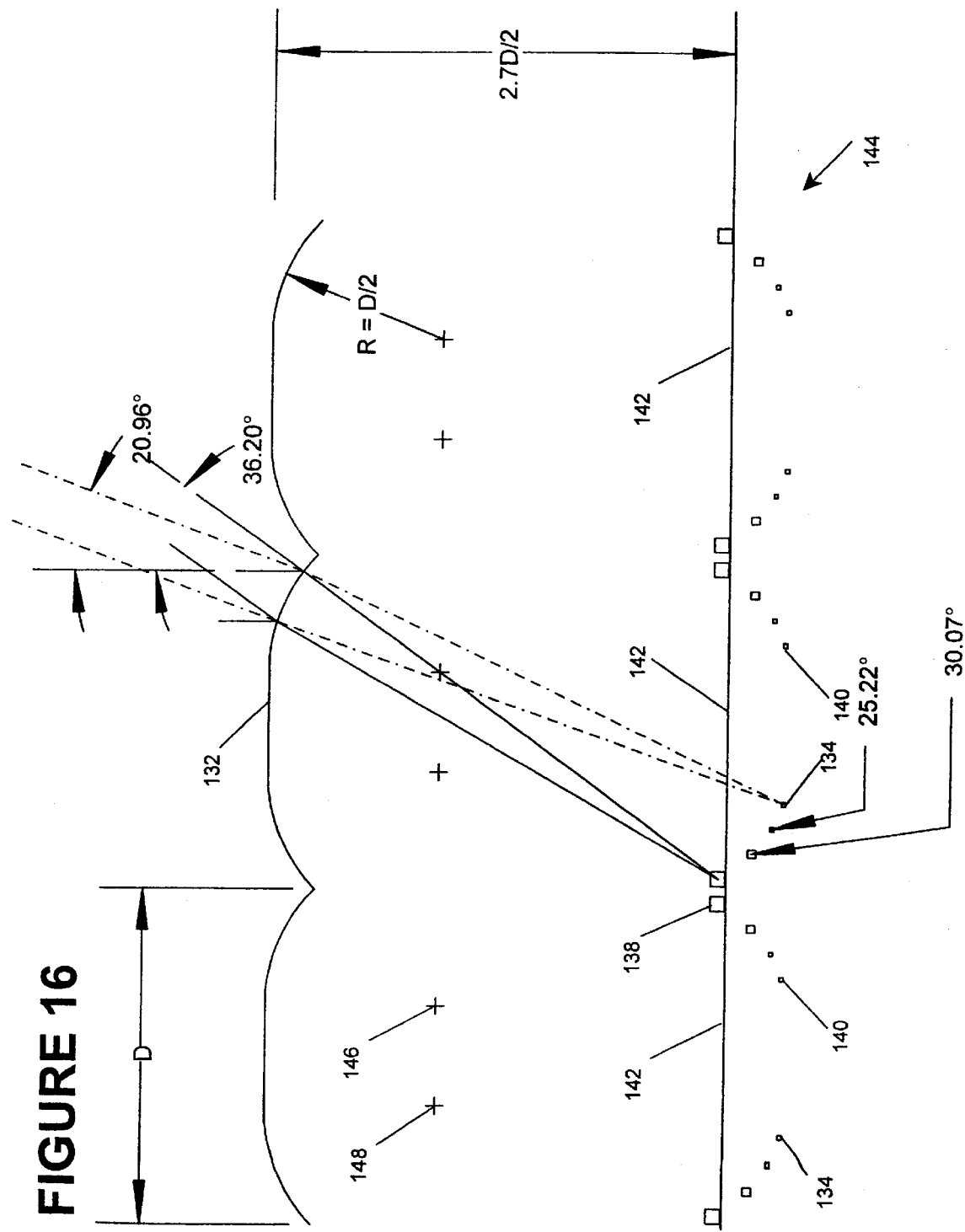
FIG. 16 is a cross section view of a portion of a fourth embodiment of a lens array according to this invention with a lens aperture of about 40%.

FIG. 16 is a cross section view of a portion of a lens array 144 according to a fourth embodiment of this invention with a lens aperture of about 40%. The average angular offset between adjacent images is about 5°. Two centers are used for referencing the arcuate surfaces of each lens. The right arcuate segment is centered to the right of the right symmetry axis 146. The left arcuate segment is centered to the left of the left symmetry axis 148. The flat portion of the lens segment 132 is about 0.4 D in comparison with about 0.2 D in the lens array embodiment shown in FIG. 14. The width of the clear portion 142 of the backside 144 is about 0.4 D.

Figure 17:
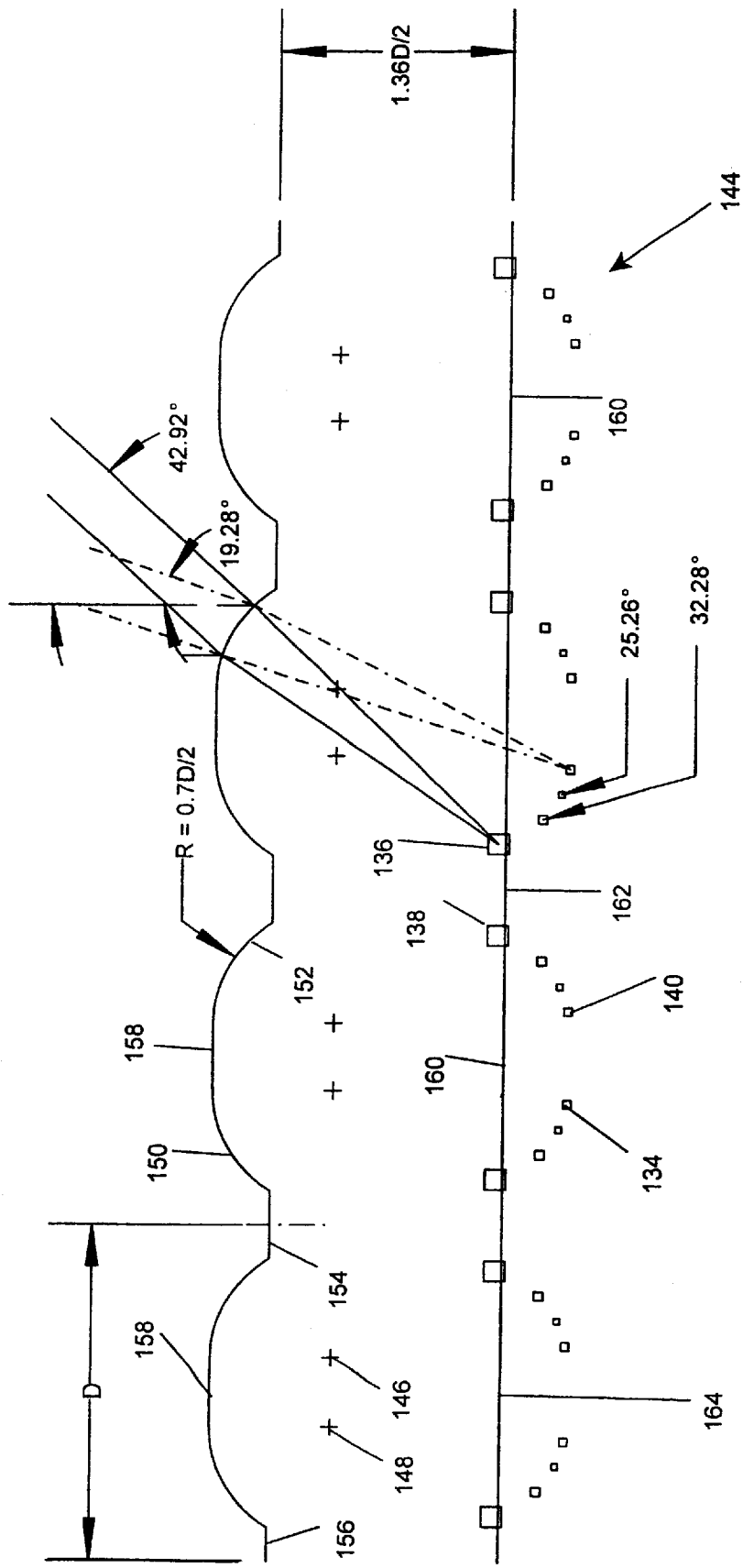
FIG. 17 is a cross section view of a portion of a fifth embodiment of a lens array according to this invention with a lens aperture of about 40%.

FIG. 17 is a cross section view of a portion of a lens array 144 of a fifth embodiment according to this invention. The lens cross section includes two arcuate segments 150, 152 that are separated by a flat segment. Each of the arcuate segments 150, 152 includes a distal end that is orthogonally positioned at a location furthest away from the backside of the lens array 144 and a proximal end that is orthogonally positioned at a location nearest to the backside of the lens array 144 The flat segment is distributed over the lens array cross section and includes a center portion 158 that interconnects the distal ends of the arcuate segments 150, 152 and a portion 154, 156 that interconnects the proximal ends of the arcuate segments 150, 152. In one embodiment, the backside of the array 144 is printed so that the first image segment 134 and the fourth image segment 136 corresponding to a right arcuate segment 152 of the lens 152 are no longer contiguous with the fifth image segment 138 and the eighth image segment 140 that correspond to a left arcuate segment 150. Between the fourth image segment 136 and the fifth image segment 138 is an unprinted stripe 162 that aligns with the flat segments 154, 156 interconnecting the proximal ends of the arcuate segments 150, 152. Between the first image segment 134 and the eighth image segment 140 is an unprinted stripe 160 that aligns with center portion of the flat segment 158. This embodiment permits small radii, in this example 0.7 D/2, effecting a thinner device, in this example 1.36 D/2. The angular displacement between image segments in the repertoire rises to over 5°.

Figure 18:
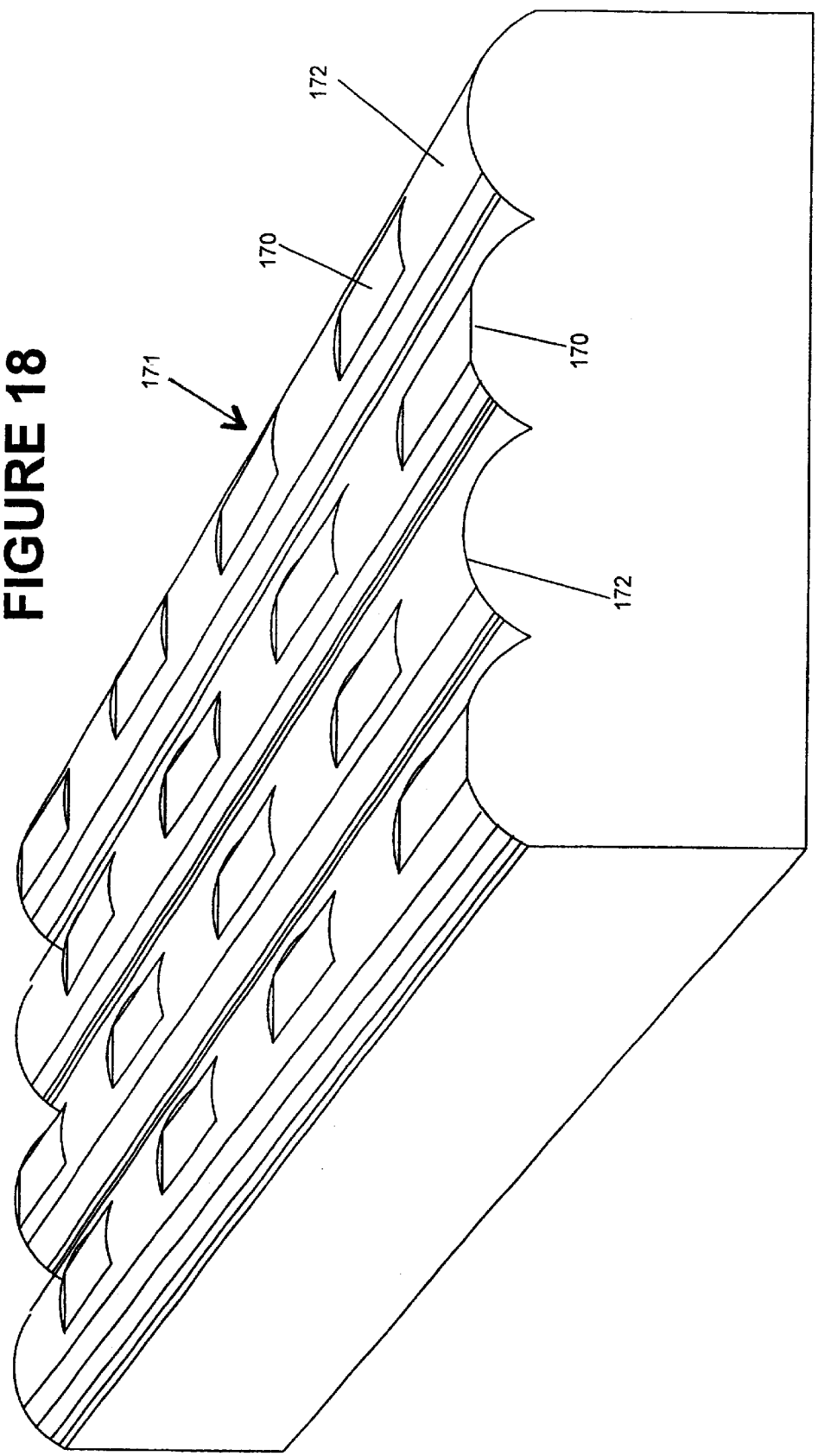
FIG. 18 is a perspective view of a portion of a sixth embodiment of a lens array according to this invention.

FIG. 18 is a perspective view of a portion of a lens array 171 of a sixth embodiment according to this invention. The flat segments are no longer continuous stripes. In this embodiment, flat portions 170 of the flat segments are arranged in an intermittent or periodic pattern, for example a checkerboard pattern, with a longitudinal spacing that is approximately the same as the width of the lenses, D. A standard stripe design can exist under the arcuate portions 172 of each cylindrical lens and a clear window under each flat portion. The flat segments can approach an equal dimension to the arcuate segments permitting transparency to approach 50%.

Figure 19:
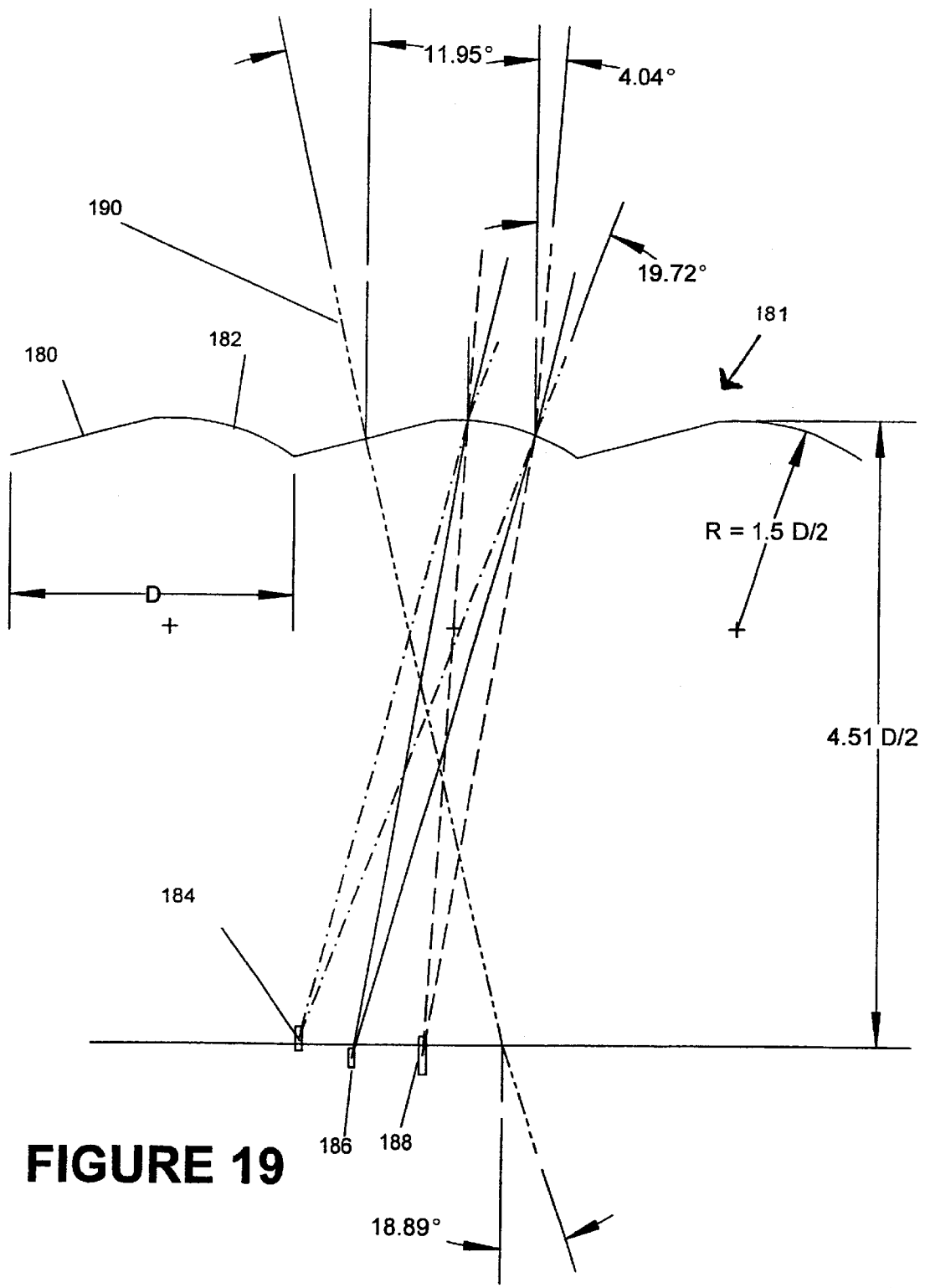
FIG. 19 is a cross section view of a portion of a seventh embodiment of a lens array according to this invention with a substantially flat aperture at about 15° with respect to horizontal.

FIG. 19 is a cross section view of a portion of a lens array 181 of a seventh embodiment according to this invention. In this embodiment, the lens cross section no longer has right-left symmetry. A flat portion of the lens 180 is set at an angle with respect to the surface. In one example, the flat portion of the lens 180 is set at an angle of about 15° and an arcuate portion 182 is formed on the right side of the flat portion 180. A repertoire of images is brought into focus at a print-side of the array 181 at box markers 184, 186 and 188. When the viewer's angle of regard is from the right, the repertoire of images will be seen. The angles of regard for viewing the repertoire of images range from about 4.04° to about 19.72°. An angle of regard of 11.95° 190 addresses a window portion 180. Any angle of regards centered at this angle will permit the viewer to see through the corresponding window portion on the print-side of the array 181. Even at 15°, some refractive displacement may be noticed. In this example, about 9° of displacement is expected. The exit line of sight is at about 18.89°. The substantially circular cross section arcuate portion 182 can be formed at different radii. In one example, the radius of the arcuate portion 182 is about 0.75 D, where D is the width of the cylindrical lenses and depends, as previously mentioned, on the design viewing distance. The angular range corresponding to the image repertoire increases with decreasing radii. The thickness of the device decreases with decreasing radii. However, the spherical distortion of the lens increases with decreasing radii. These considerations represent design tradeoffs.

Figure 20:
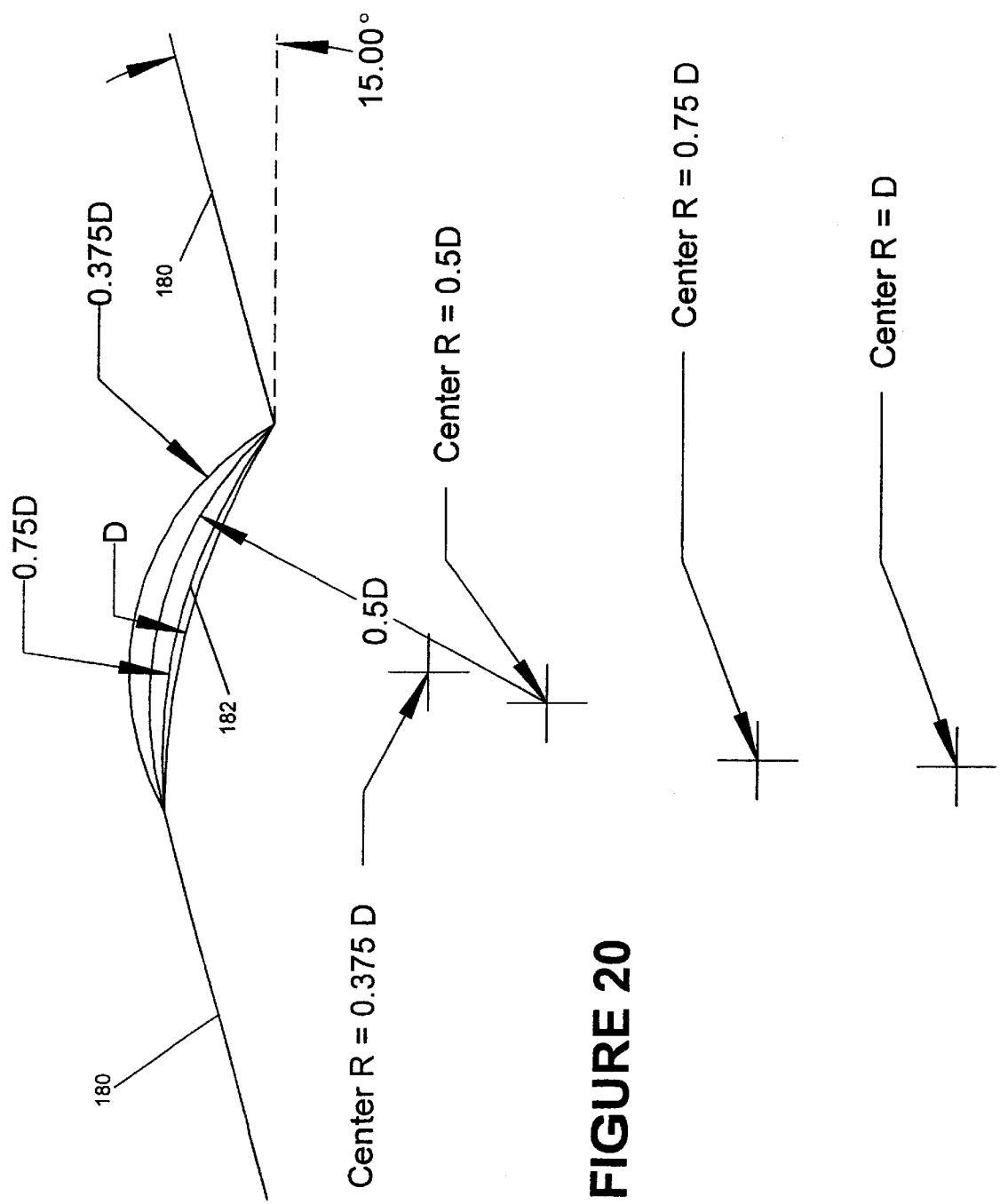
FIG. 20 is a cross section view of the lens array shown in FIG. 19 showing multiple embodiments of the lens array with a gamut of radii.
Figure 21:
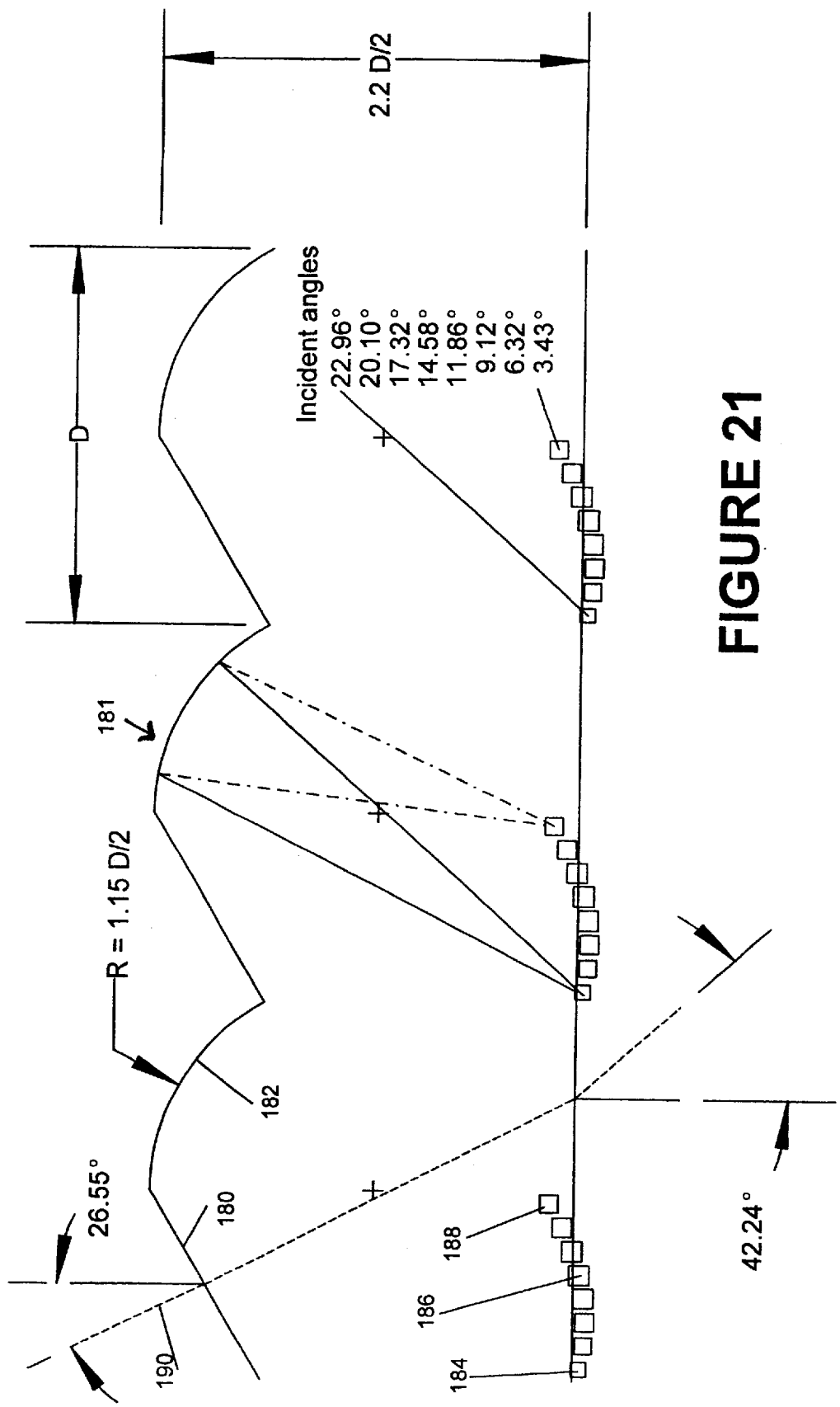
FIG. 21 is a cross section view of the lens array shown in FIG. 19 with a substantially flat aperture set at an angle of about 30° with respect to horizontal.

FIG. 20 is a cross section view of the lens array 181 shown in FIG. 19 showing multiple embodiments of the lens array with a gamut of radii. In one example, the flat portion 180 of the lens is set at an angle of about 15°. The centers and radii of four possible designs are shown. FIG. 21 is a cross section view of the lens array 181 shown in FIG. 19 with a substantially flat aperture set at an angle of about 30° with respect to horizontal. In one example, the arcuate portion 182 has a radius of about 1.15 D/2 to yield a thin lens array. The line of sight corresponding with the flat portion 180 aligns with the clear portion of the back of the array 190 at an angle of about 26.55°. In this example, the refracted line of sight exiting the lens array 181 is about 42.24° which is significantly different from the entry line of sight.

SUMMARY OF THE ACHIEVEMENT OF THE OBJECTS OF THE INVENTION

From the foregoing, it is readily apparent that I have invented an advertising medium for use in retail store windows with optical properties that draw the attention of customers by offering a display of two different products or two different views of a single product from the viewer-side without losing outside awareness through the window regardless of whether the viewer-side faces inward or outward. The present invention provides a device that appears to have dimension and to flip or morph from one image to the next. The present invention provides a device which acts as a one-way window wherein viewers on the lenticular side of the window can view the room beyond while viewers on the backside of the array cannot see through the device. The present invention provides a device with optical anisotropy for the usual purposes of this property such as anti-glare screens for computer monitors including flat panel monitors, viewing security for computer monitors including ATM monitors, antiglare dashboard displays, antiglare cockpit displays and any other application of a display where it is difficult to control ambient illumination.

What is claimed is:

1. A substantially transparent sheet having anisotropic optical properties comprising:
    a body of transparent material having a pair of opposing sides and an index of refraction substantially greater than one; and
    a plurality of plano-convex lenses formed on a first side of said pair of opposing sides and substantially covering said first side, each of said plurality of plano-convex lenses comprising:
        two elongate arcuate segments; and
        at least one elongate substantially planar segment interconnecting said two elongate arcuate segments;
    wherein each of said plurality of plano-convex lenses has a substantially circular cross section and pre-determined dimensions based on a pre-determined distance between said transparent sheet and a viewer.

2. A substantially transparent sheet in accordance with claim 1 further comprising:
    a dissection of at least one pre-determined image affixed to a second side of said pair of opposing sides of said body of transparent material, said dissection having image-free zones aligned with said at least one planar segment and interrupting said at least one pre-determined image thereby allowing parallel light rays to pass through said sheet unimpeded, wherein said at least one pre-determined image is seen by the viewer depending on an angle of regard.

3. A substantially transparent sheet in accordance with claim 2 wherein said sheet when viewed over a first range of angles of regard present the viewer with a gamut of predetermined images based on said dissection; and wherein said sheet when viewed over a second range of angles present the viewer with an undistorted image of a scene on the other side of said transparent sheet.

4. A substantially transparent sheet in accordance with claim 1 wherein said body of transparent material has a thickness substantially less than the other dimensions of said body of transparent material; and wherein said thickness of said body of transparent material and the radii of each of said two arcuate segments cause parallel light rays traversing said sheet to converge on a non-viewer side of said transparent sheet at a gamut of foci depending on the angles that the light rays make with respect to the normal of said transparent sheet.

5. A substantially transparent sheet in accordance with claim 1 wherein said two arcuate segments of each of said plurality of plano-convex lenses comprise:
   a first arcuate segment having a first axis, a first radius originating from said first axis and a first arcuate surface radially disposed from said first axis at a distance corresponding to said first radius; and
   a second arcuate segment having a second axis, a second radius originating from said second axis and a second arcuate surface radially disposed from said second axis at a distance corresponding to said second radius.

6. A substantially transparent sheet in accordance with claim 5 wherein said second axis is substantially coaxial with said first axis; and wherein said first arcuate segment has a distal end and a proximal end and said second arcuate segment has a distal end and a proximal end, each of said at least one planar segment of each of said plurality of plano-convex lenses interconnects said proximal end of said first arcuate segment with said proximal end of said second arcuate segment; and wherein each of said at least one planar segment is substantially parallel to a second side of said body of transparent material.

7. A substantially transparent sheet in accordance with claim 5 further comprising at least one interconnecting planar segment separating at least one pair of adjacent plano-convex lenses, said at least one interconnecting planar segment connecting a distal end of said arcuate segment of one of said at least one pair of adjacent plano-convex lenses with a distal end of said arcuate segment of the other of said at least one pair of adjacent plano-convex lenses, said at least one interconnecting planar segment substantially parallel to said second side of said body of transparent material.

8. A substantially transparent sheet in accordance with claim 1 wherein said at least one planar segment is discontinuous along the length of said at least one planar segment and interleaved between each of said plurality of plano-convex lenses in a uniform pattern.

9. A substantially transparent sheet in accordance with claim 1 wherein each of said at least one planar segment is positioned at an angle with respect to a second side of said body of transparent material.

10. A substantially transparent sheet in accordance with claim 2 wherein said dissection on said second side is printed directly on said second side of said body of transparent material.

11. A substantially transparent sheet in accordance with claim 1 further comprising a second sheet having an image printed on said second sheet, said second sheet laminated to a second side of said transparent sheet.

12. A substantially transparent sheet having anisotropic optical properties comprising:
   a body of transparent material having a first side and a second side opposing said first side; and
   a plurality of plano-convex lenses formed on said first side of said body of transparent material and substantially covering said first side, each of said plurality of plano-convex lenses comprising:
      two elongate arcuate segments, each of said two elongate arcuate segments having an axis along the length of each segment, a proximal end, a distal end and a cross sectional perimeter radially disposed from said axis; and
      at least one elongate substantially planar segment interconnecting said distal ends of said two elongate arcuate segments, said at least one elongate substantially planar segment parallel to said second side of said body of transparent material.

13. A substantially transparent sheet in accordance with claim 12 wherein said axis of each of said two elongate arcuate segments is coaxial.

14. A substantially transparent sheet in accordance with claim 12 wherein said axis of each of said two elongate arcuate segments are substantially parallel to each other and non-coaxial.

15. A substantially transparent sheet in accordance with claim 13 further comprising at least one interconnecting planar segment separating at least one pair of adjacent plano-convex lenses, said at least one interconnecting planar segment connecting said proximal end of one of said two elongate arcuate segments of one of said at least one pair of adjacent plano-convex lenses with said proximal end of the other of said two elongate arcuate segments of one of said at least one pair of adjacent plano-convex lenses, said at least one interconnecting planar segment substantially parallel to said second side of said body of transparent material.

16. A substantially transparent sheet in accordance with claim 12 wherein said at least one planar segment is discontinuous along the length of said at least one planar segment and interleaved between each of said plurality of plano-convex lenses in a uniform pattern.

17. A substantially transparent sheet in accordance with claim 12 wherein each of said at least one planar segment is positioned at an angle with respect to said second side of said body of transparent material.

18. A substantially transparent sheet in accordance with claim 12 further comprising a dissection of at least one pre-determined image affixed to said second side of said body of transparent material, said dissection having image-free zones aligned with said at least one planar segment and interrupting said at least one pre-determined image thereby allowing parallel light rays to pass through said sheet unimpeded, said dissection on said second side is printed directly on said second side of said body of transparent material; wherein said at least one pre-determined image is seen by the viewer depending on an angle of regard.

19. A substantially transparent sheet in accordance with claim 12 further comprising a second sheet having an image printed on said second sheet, said second sheet laminated to said second side of said body of transparent material.

20. A substantially transparent sheet having anisotropic optical properties comprising:
   a body of transparent material having a first side and a second side opposing said first side; and
   a plurality of plano-convex lenses formed on said first side of said body of transparent material and substantially covering said first side, each of said plurality of plano-convex lenses comprising:
      an arcuate segment having an axis along the length of said segment, a proximal end, a distal end and a cross sectional perimeter radially disposed from said axis; and
      an elongate substantially planar segment connected to said distal end of said arcuate segment, said elongate substantially planar segment non-planar with respect to said second side of said body of transparent material.

* * * * *